United States Patent [19]

Takase et al.

[11] Patent Number: 4,612,585

[45] Date of Patent: Sep. 16, 1986

[54] CHROMINANCE SIGNAL RECORDING AND REPRODUCING APPARATUS

[75] Inventors: Osamu Takase; Tomomitsu Kuroyanagi, both of Katsuta, Japan

[73] Assignee: Hitachi, Ltd., Tokyo, Japan

[21] Appl. No.: 530,629

[22] Filed: Sep. 9, 1983

[30] Foreign Application Priority Data

Sep. 10, 1982 [JP] Japan .................. 57-156603
Sep. 13, 1982 [JP] Japan .................. 57-158101
Sep. 13, 1982 [JP] Japan .................. 57-158103
Jan. 28, 1983 [JP] Japan .................. 58-11558

[51] Int. Cl.$^4$ .................. H04N 5/76; H04N 9/493
[52] U.S. Cl. .................. 358/316; 358/328
[58] Field of Search .............. 358/310, 315, 316, 328, 358/330, 335, 340, 329; 360/33.1, 65

[56] References Cited

U.S. PATENT DOCUMENTS 4,303,952 12/1981 Yamamitsu et al. .............. 360/29 X
4,524,380 6/1985 Shibata et al. .................. 358/329 X Primary Examiner—Robert L. Richardson
Attorney, Agent, or Firm—Antonelli, Terry & Wands

[57] ABSTRACT

A chrominance signal recording and reproducing circuit for a video tape recorder in which a frequency-modulated luminance signal and a low-frequency converted chrominance signal are mixed to be recorded and reproduced. A sideband emphasis type dynamic emphasis circuit composed of a diode limiter circuitry and an LC trap circuitry is provided in a recording system for recording the chrominance signal, while a sideband deemphasis circuit composed of at least a diode limiter circuitry and an LC trap circuitry is provided in a chrominance signal reproducing system. A circuit configuration is adopted in which the functions of the emphasis circuit and the deemphasis circuit are exchangeably performed by a common circuit.

19 Claims, 32 Drawing Figures

CHROMINANCE SIGNAL RECORDING AND REPRODUCING APPARATUS

The present invention relates to a chrominance signal recording/reproducing apparatus suited for use in a video tape recorder.

In conventional video tape recorders, it is known to provide a comb filter in a chrominance signal reproducing circuit chain with a view to removing cross-talk signals intervening from the adjacent video tracks by delaying the chrominance signal for a single horizontal scan period (1H).

However, in the video tape recorder of the type mentioned above, spurious signals are produced by the comb filter (delay line) itself, giving rise to a problem that the spurious signals make appearance on the reproduced picture as disturbance. Further, a part of the lower side band of the luminance signal will leak to the low-frequency converted chrominance signal (a sort of cross-talk), involving the problem of cross-color. Besides, when deviation of the horizontal scan period (H) from that of the adjacent track amounts to 1.0H or 0.75, deviation will occur in the juxtaposed array of Hs (i.e. the recording positions of the horizontal period signal are located adjacent to one another among the adjacent tracks), resulting in the leakage of the burst signal from the adjacent tracks.

There is also known a video tape recorder in which an audio signal A interposed between the luminance signal Y' and the low-frequency converted chrominance signal, as is illustrated in FIG. 1, wherein the audio signal is modulated in frequency and recorded on a video track together with the video signals (luminance signal Y', chrominance signal C' and the like) in multiplex, to thereby improve the tone quality.

However, in the video tape recorder in which the signal spectrum shown in FIG. 1 is recorded and reproduced, the pilot signal P and the FM audio signal A may interfere with the chrominance signal C' to deteriorate the image quality of reproduced color picture, to another difficulty. More particularly, the pilot signal P and the FM audio signal A may be reproduced as the sideband signal of the chrominance signal, bringing about beat disturbance on the reproduced picture. Such beat disturbance may also take place due to the spurious signal $f_c \pm 2f_p$ (where $f_c$ represents the chrominance frequency and $f_p$ represents the pilot frequency) ascribable to the non-linearity of the tape/head system.

The occurrence of disturbances mentioned above may be explained by the facts that the chrominance signal is recorded through modulation of amplitude (AM), the frequencies of the pilot signal and the FM audio signal are located close to the frequency band of the chrominance signal, and that the level at which the pilot signal and the FM audio signal are recorded is not adequately low.

Under the circumstances, it is conceivable to remove the disturbance mentioned above by sufficiently distancing the frequencies of the various signals in concern, or recording the chrominance signal after conversion to FM signal. This method however requires a broad band width, resulting in reduction of the recording density, to a disadvantage. The recording level of the pilot signal and the FM audio signal may be lowered as desired. But a problem will then arise with respect to the tracking control characteristic and the tone quality.

An object of the present invention is to eliminate the shortcomings of the prior art and provide a chrominance signal recording/reproducing circuit for a video tape recorder which is capable of reducing noise admixed in the chrominance signal.

Another object of the invention is to provide a chrominance signal recording/reproducing circuit which is scarcely susceptible to the disturbance due to the pilot signal, FM audio signal and others.

A still further object of the invention is to provide a chrominance signal recording/reproducing circuit which is suited to be realized in such a circuit configuration that a circuit can be used in common for both recording and reproducing operations.

In view of the above objects, there is provided according to the invention a circuit means by which the input chrominance signal of a small amplitude is subjected to sideband emphasis and sideband deemphasis in the recording and reproducing operations, respectively. The circuit means is composed of a variable impedance element constituted by an anti-parallel connection of diodes and a trap circuit constituted by an inductance L and a capacitor C. The emphasis characteristic and the deemphasis characteristic are so determined as to be reciprocal to each other. The functions of emphasis and deemphasis are exchangeably executed by a common circuit, to reduce the circuit dimension or scale.

The present invention will be apparent from the following detailed description taken in conjunction with the accompanying drawings, in which.

Figure 6:
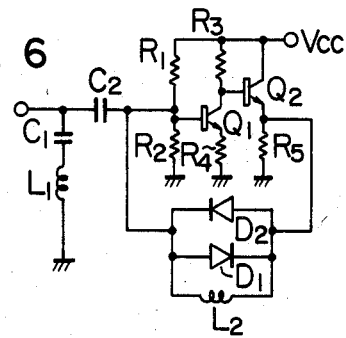
Figure 9A:
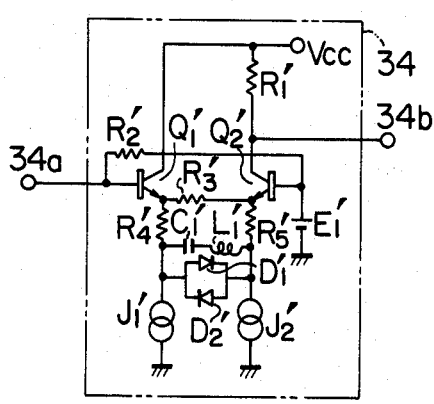
Figure 9B:
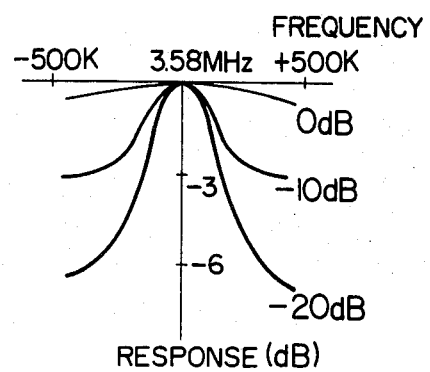
Figure 10:
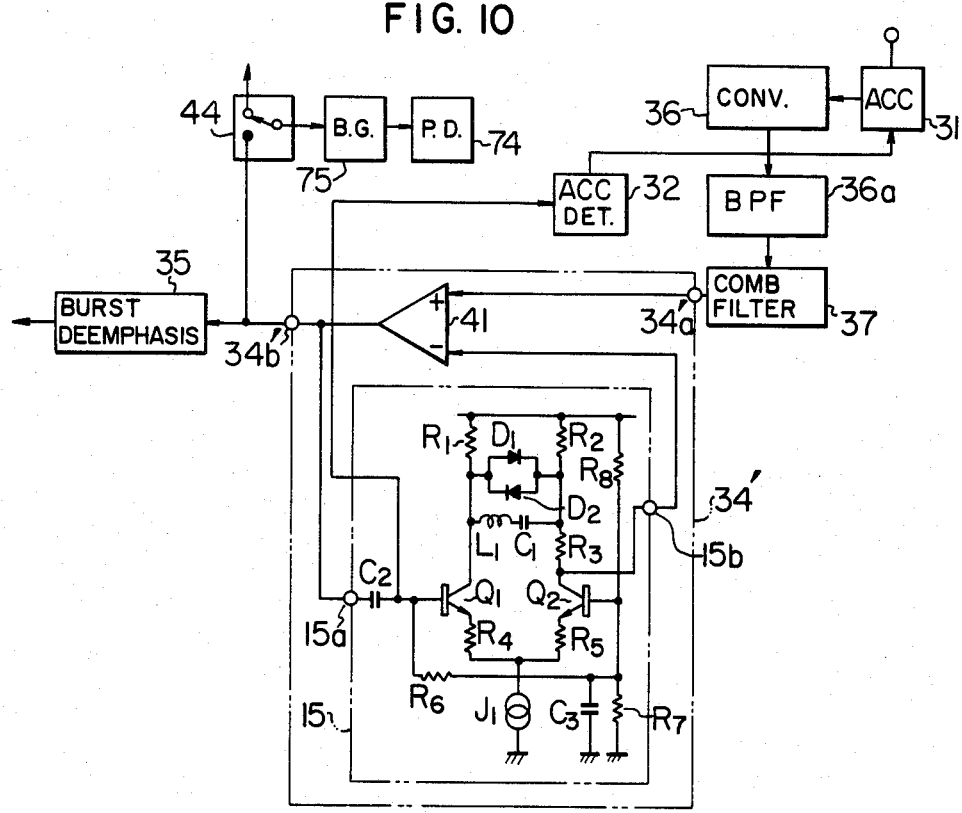
Figure 11:
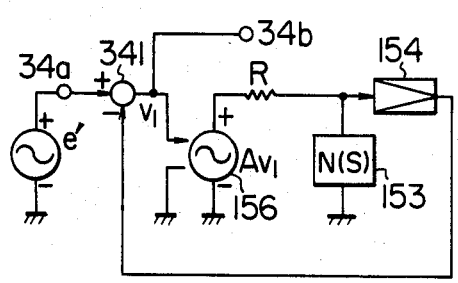
Figure 12:
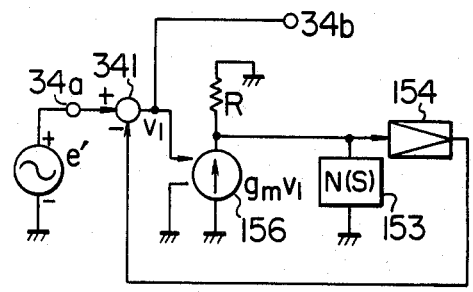
Figure 13:
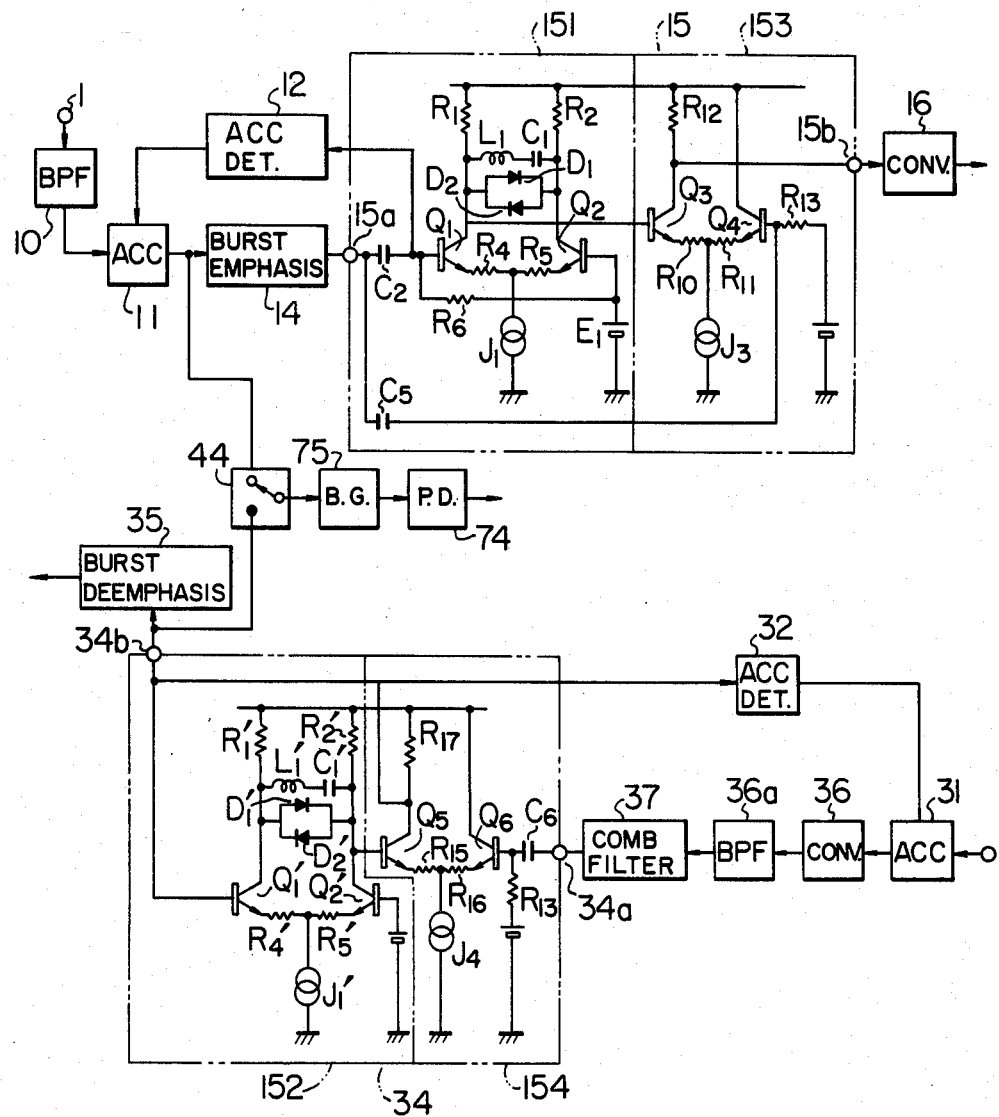
Figure 14:
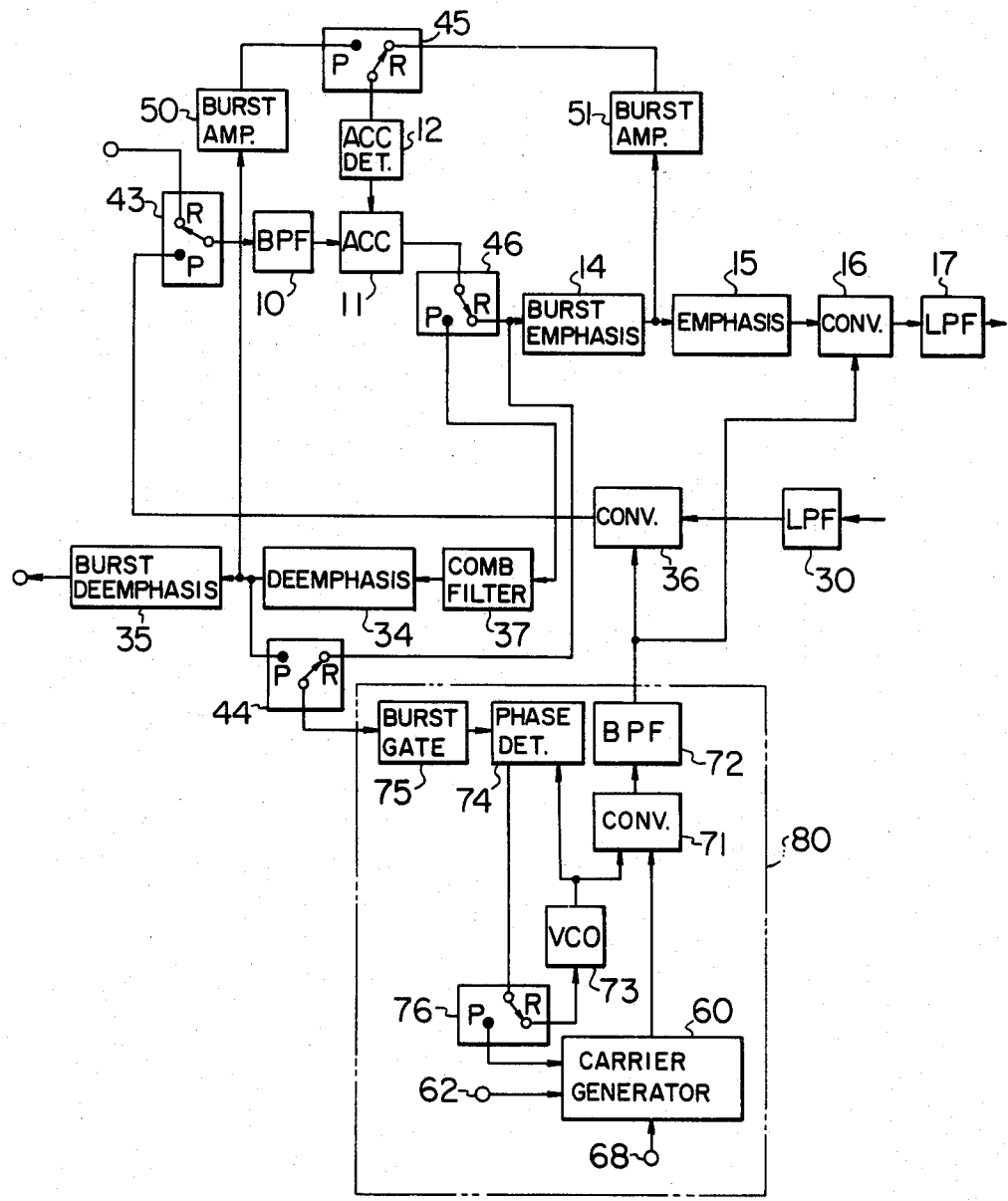
Figure 15:
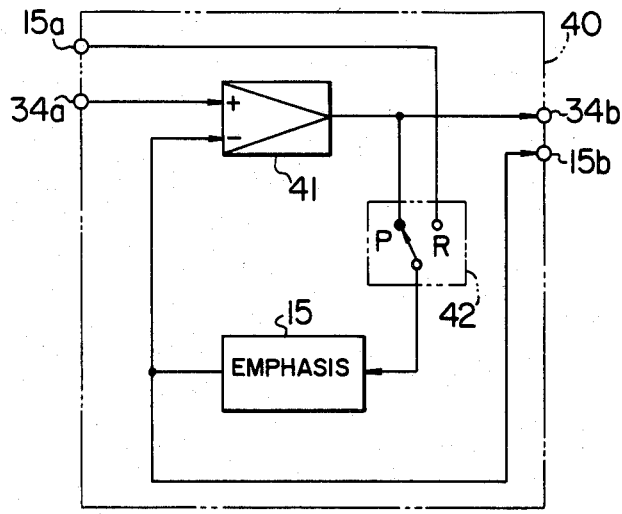
Figure 16:
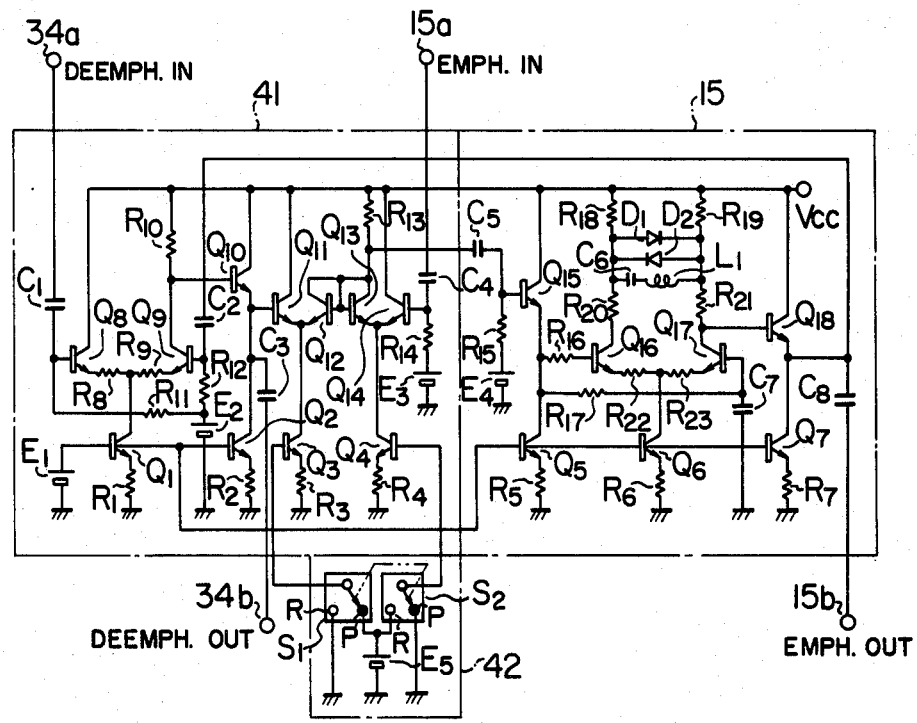
Figure 17:
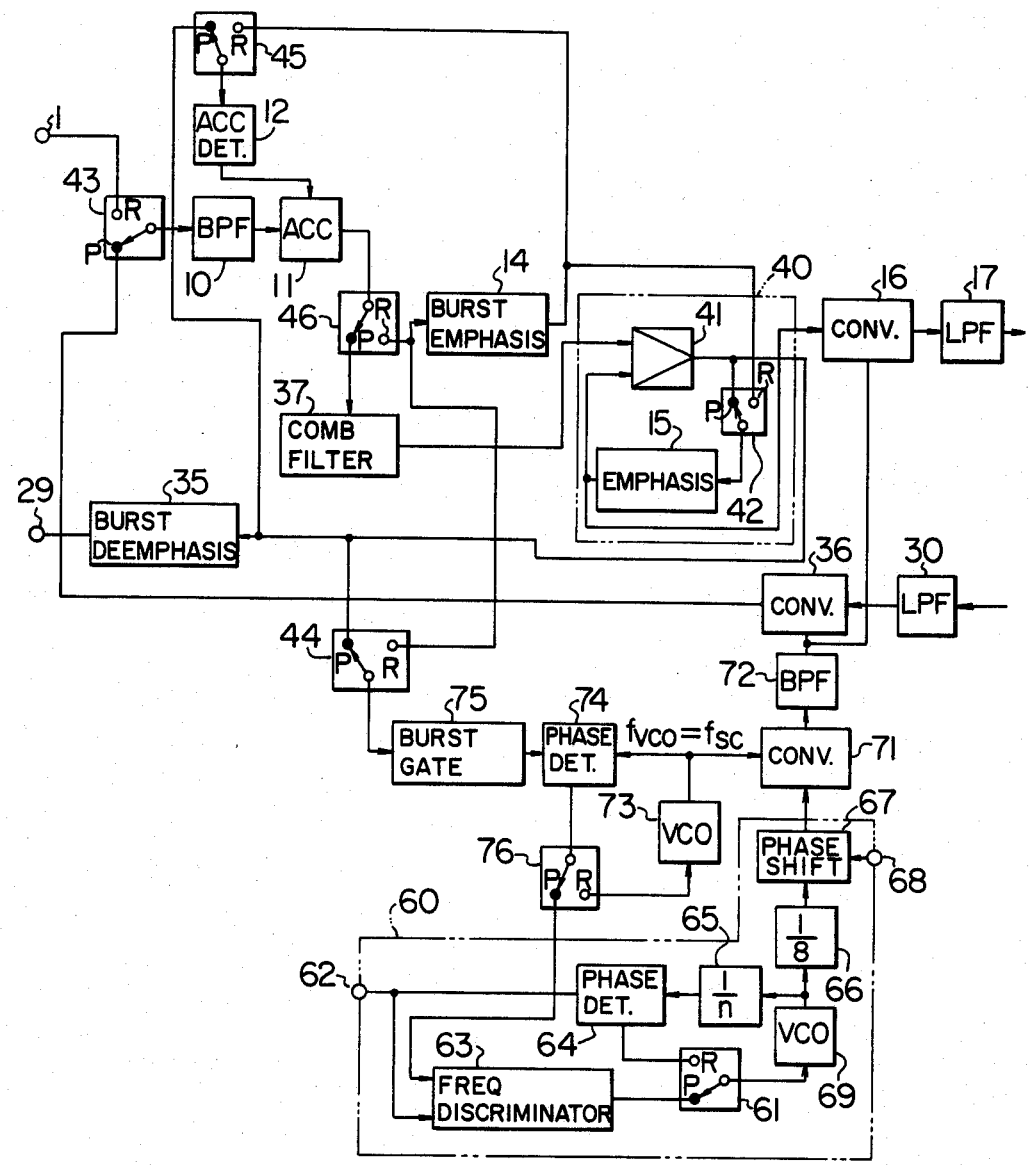
Figure 18:
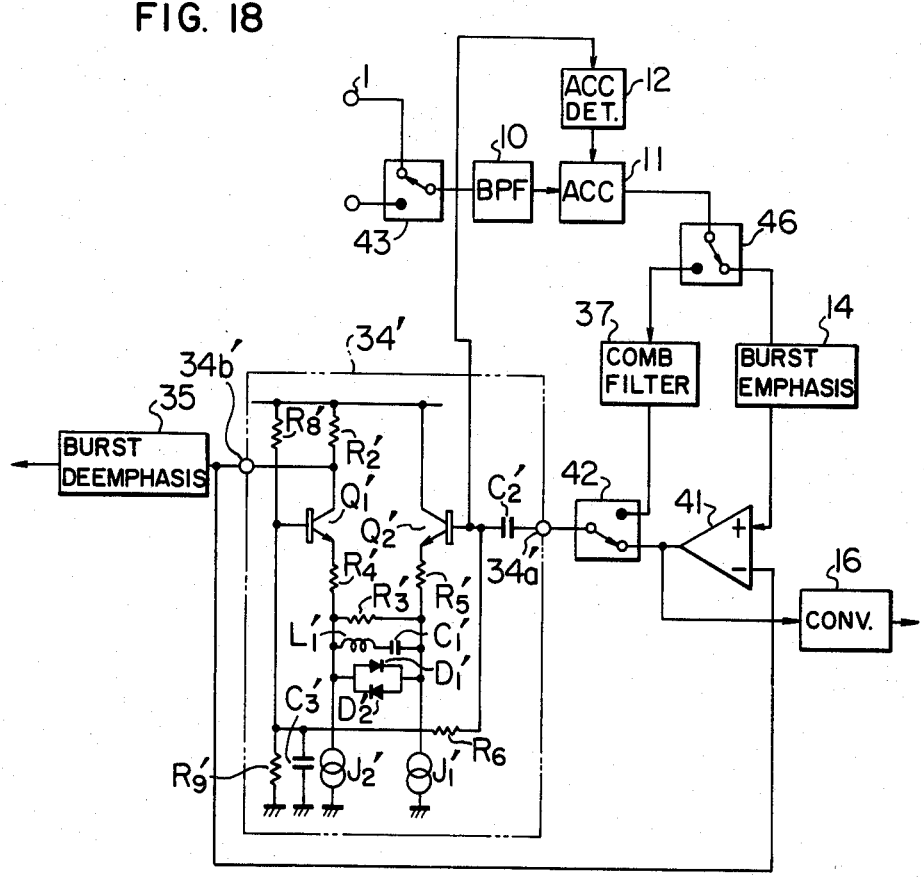
Figure 19A:
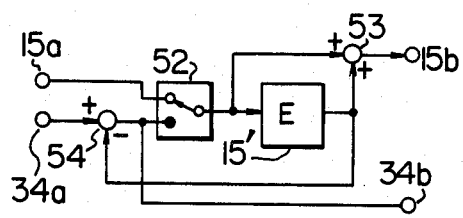
Figure 19B:
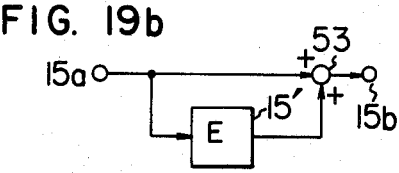
Figure 19C:
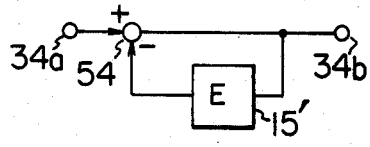
Figure 20:
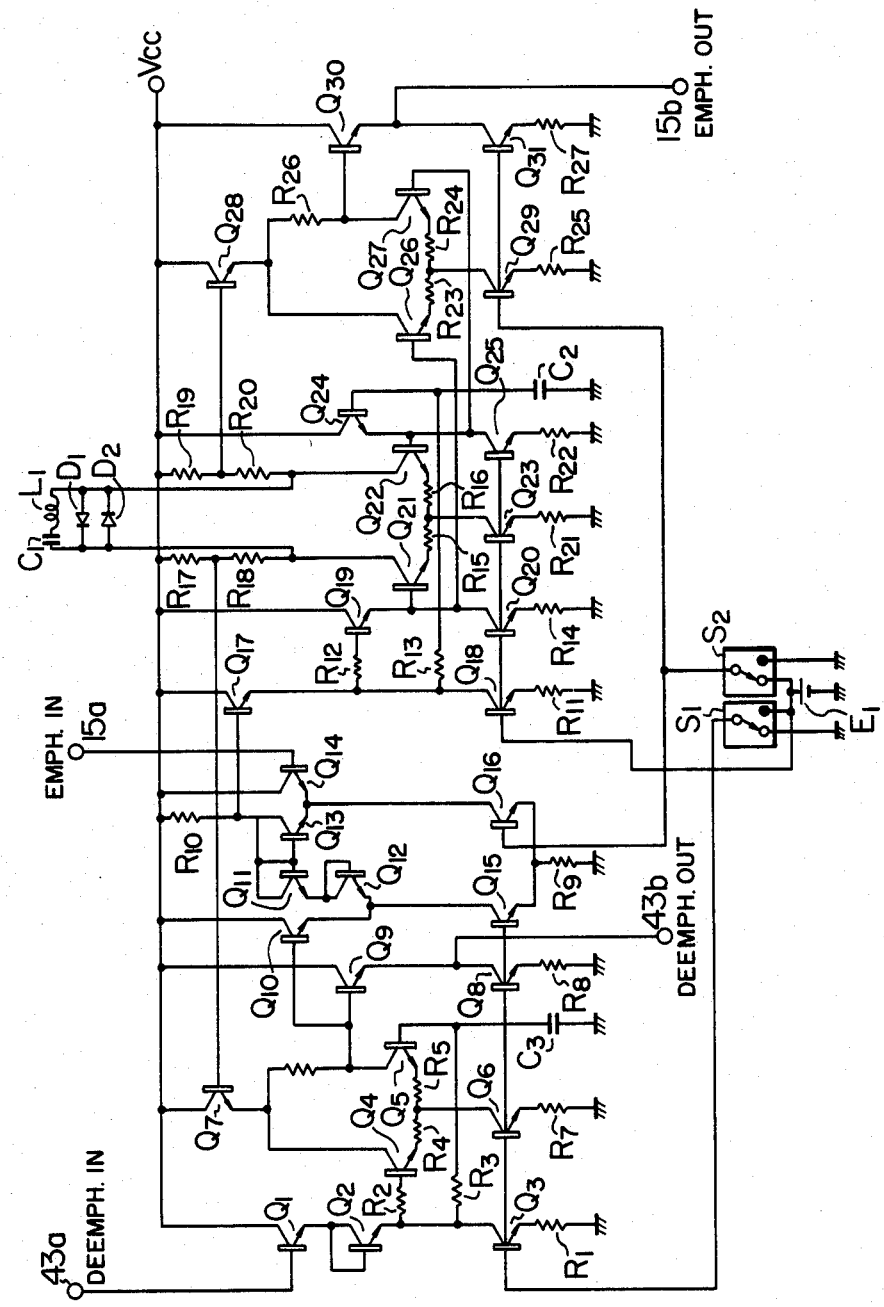
Figure 24:
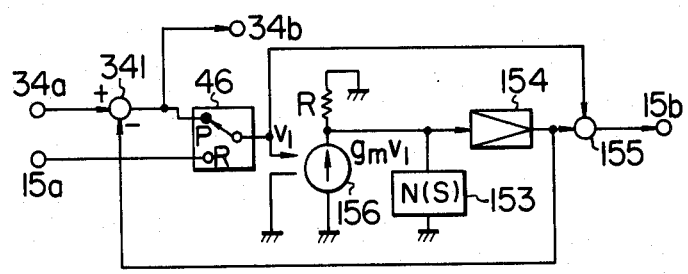
Figure 25:
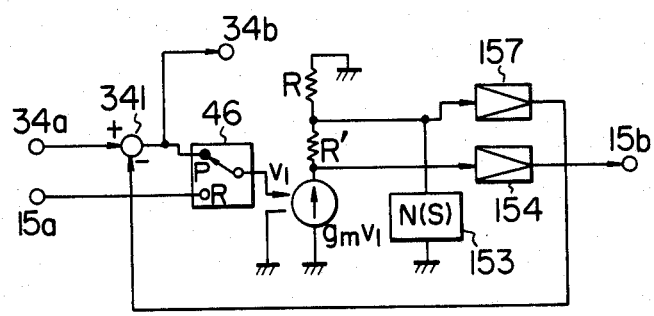
Figure 26:
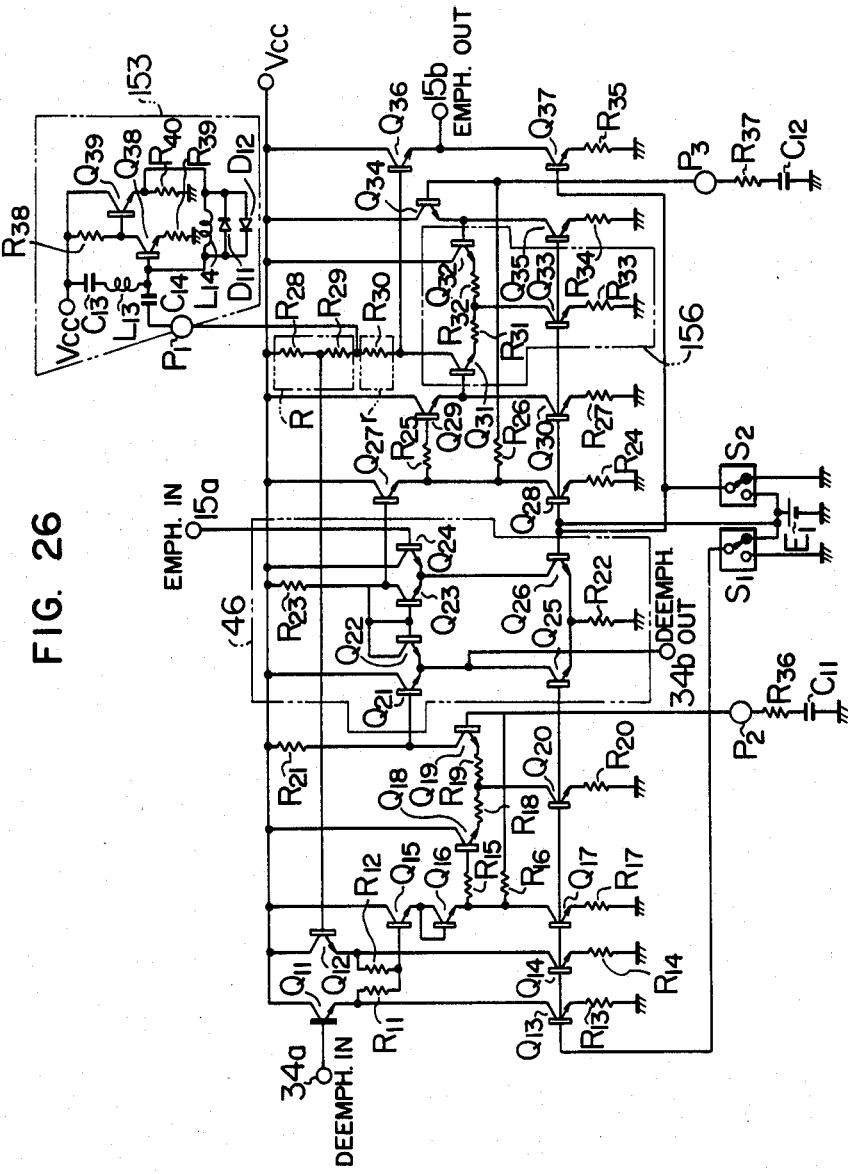

FIGS. 4, 5, 7, and 8 are views showing, respectively, the emphasis circuits according to other embodiments of the invention;

FIG. 6 is a view showing an example of a non-linear emphasis circuit;

FIGS. 9a and 9b are views illustrating an arrangement and operation of an embodiment of the invention;

FIGS. 10 to 12 are views showing the emphasis circuits according to other embodiments of the invention;

FIG. 13 is a circuit diagram of an emphasis/deemphasis circuit according to an embodiment of the invention;

FIG. 14 is a circuit diagram showing a chrominance signal recording/reproducing circuit according to another embodiment of the invention;

FIG. 15 is a view illustrating the principle of a combined emphasis and deemphasis circuit according to an embodiment of the invention;

FIG. 16 is a circuit diagram showing details of the circuit shown in FIG. 15;

FIG. 17 is a circuit diagram showing a chrominance signal recording/reproducing circuit in which a combined emphasis/deemphasis circuit is employed according to an embodiment of the invention;

FIG. 18 is a circuit diagram showing an exemplary embodiment of the combined emphasis/deemphasis circuit;

FIGS. 19a, 19b, 19c, 21a, 21b, and 21c are views illustrating, respectively, examples of the combined emphasis/deemphasis circuit;

FIG. 20 is a view showing details of the embodiment shown in FIG. 19;

FIGS. 22 to 25 are views showing, respectively, other exemplary embodiments of the combined emphasis/deemphasis circuit; and FIG. 26 is a view showing the emphasis/deemphasis circuit according to still another embodiment of the invention.

Figure 2:
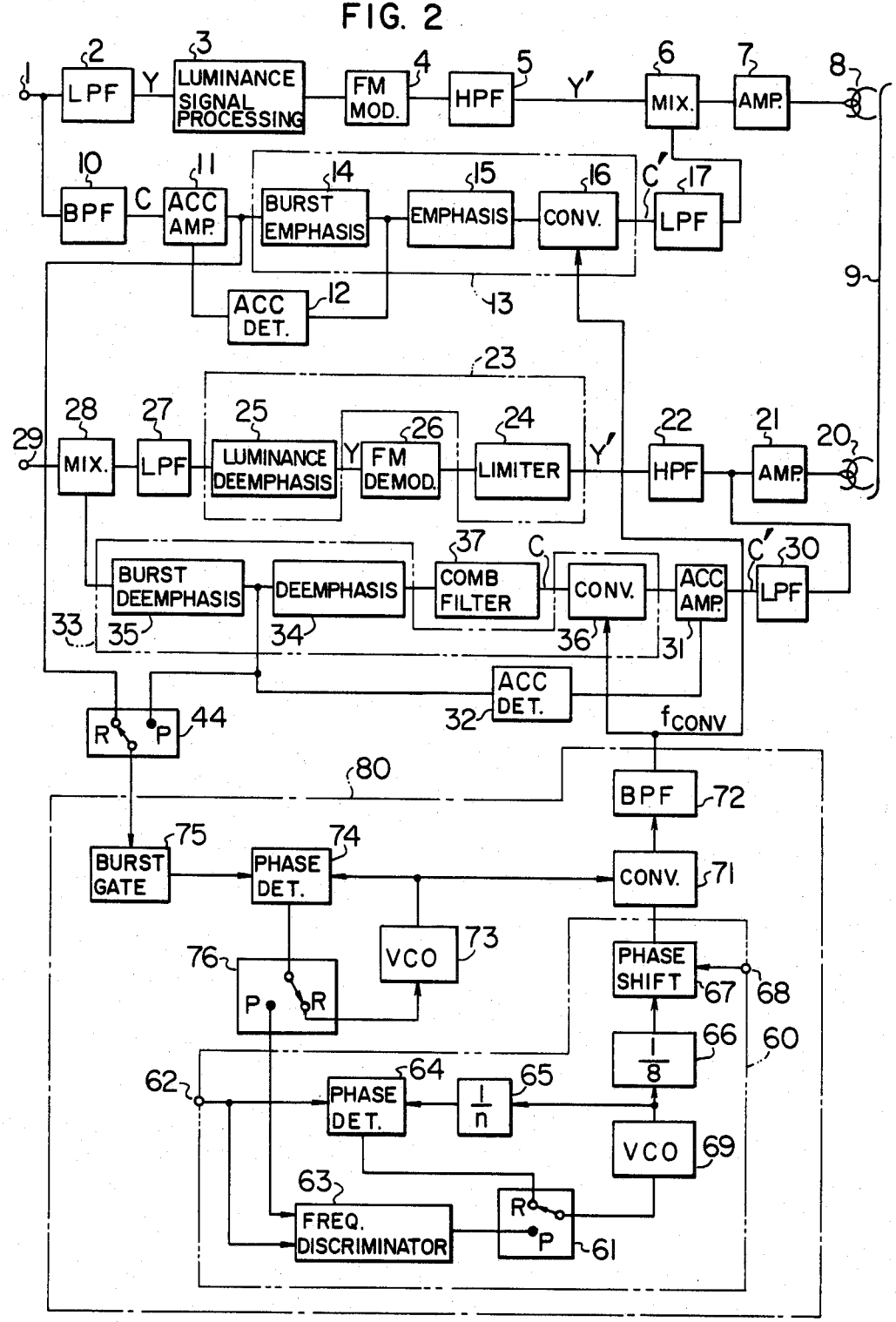
FIG. 2 is a view showing a chrominance signal recording/reproducing circuit according to an embodiment of the present invention.

Now, the invention will be described. FIG. 2 shows in a block diagram a general arrangement of a signal recording/reproducing circuit for a video tape recorder.

By referring to this figure, description will first be made of a recording system, or channel. A video signal applied to a video signal input terminal 1 is separated into a luminance signal Y and a chrominance signal C by a low-pass filter (hereinafter referred to as LPF in abbreviation) 2 and a band pass filter (herinafter abbreviated to BPF) 10. The luminance signal Y is supplied to a FM modulator circuit 4 by way of a luminance signal processing circuit 8 to undergo frequency modulation and thereafter supplied to the succeeding stage of a high-pass filter (hereinafter referred to as HPF in abridgment) 5 and hence to a mixing circuit 6. On the other hand, the chrominance signal C is supplied to a chrominance signal processing circuit 13 through an automatic chrominance signal control circuit (hereinafter abbreviated to ACC) 11. Through a circuit including a frequency converter 16 of the chrominance signal processing circuit 13, the output signal of the ACC 11 is mixed with an output frequency $f_{CONV}$ produced by a frequency generating circuit 80 including a carrier signal generating circuit 60 to be thereby converted into a low-frequency converted chrominance signal C'. The chrominance signal processing circuit 13 is composed of a burst emphasis circuitry 14, the converter 16, an emphasis circuit 15 described hereinafter and others. The low-frequency converted chrominance signal C' is supplied to a mixer circuit 6 through a LPF 17 together with a pilot signal P for tracking control injected through the converter 16, to be added to the afore-mentioned FM (frequency-modulated) luminance signal and FM audio signal. The output signal of the mixer 6 is supplied to a video head 8 through a recording amplifier 7 to be recorded on a magnetic tape 9.

Next, description will be made with regard to a reproducing channel or system. A video signal picked up by a video head 20 is amplified by a reproducing amplifier 21 to be separated into the luminance signal Y' and the low-frequency converted chrominance signal C' through a HPF 22 and a LPF 30, respectively. The frequency-modulated luminance signal is subjected to a processing known per se at a luminance signal reproducing processor circuit 23 and demodulated to the luminance signal Y to be supplied to a mixer circuit 28 through a LPF 27.

The luminance signal reproducing processor circuit 23 is composed of a drop-out cancelling circuitry (not shown), a limiter circuitry 24, a luminance signal deemphasis circuitry 25 and others. On the other hand, the low-frequency converted chrominance signal C' is supplied through an ACC circuit composed of a variable gain amplifier 31 and a detector circuit 32 to a chrominance signal reproducing processor circuit 33 and a comb filter 37 to be thereby converted to the chrominance signal C from the low-frequency chrominance signal C'. The chrominance signal C thus reproduced is supplied to the mixing circuit 28. The chrominance signal reproducing processor circuit 33 is composed of a circuit 36 including at least a frequency converter, and a circuit 35 including a burst deemphasis circuit, a pseudo burst eliminating circuit, a HPF and others, and a deemphasis circuit 34 described hereinafter. The luminance signal and the chrominance signal are mixed with each other to be outputted as a reproduced video signal from a video output terminal 29.

Since recording/reproducing operations of the systems described above are generally known, further detail description thereof will be unnecessary.

In the arrangement of the chrominance signal reproducing channel in which the comb filter 37 is incorporated, there arise the problems such as described hereinbefore. Further, the circuit 33 includes a bandpass filter provided between the converter 36 and the comb filter 37, though not shown in FIG. 2.

There is shown in the block diagram of FIG. 2 an arrangement according to an embodiment of the present invention which allows the problems in concern to be solved successfully. More particularly, the side-band emphasis type dynamic emphasis circuit 15 mentioned hereinbefore for emphasizing the side band of the chrominance signal (small-amplitude input signal) is provided in the chrominance signal processing circuit 13 of the recording channel, while a dynamic deemphasis circuit 34 exhibiting characteristic reverse or reciprocal to the emphasis characteristic of the emphasis circuit 15 is provided in the chrominance signal processing circuit 33 belonging to the reproducing channel. In this connection, it should be mentioned that fluctuations in signal level of the chrominance signal inputted to the emphasis circuit 15 and the deemphasis circuit 34 results in fluctuations in the characteristic of the emphasis circuit and the deemphasis circuit, respectively, involving difficulty in the exchangeability of recording tapes, degradation in color transient characteristic of the reproduced signal and deterioration in the picture quality. Accordingly, it is very important to take measures for preventing fluctuation in the input levels of the emphasis circuit and the deemphasis circuit. To this end, it is desirable to provide the emphasis circuit and the deemphasis circuit in succession to the ACC circuits (11, 14) and (31, 32), respectively, for controlling the burst emphasis signal to be at a constant level, to thereby make constant the levels of the input signals to the emphasis circuit 15 and the deemphasis circuit 34.

By the way, circuit arrangement shown as enclosed by a block 80 will be described in details hereinafter in conjunction with FIG. 17.

Now, the emphasis circuit 15 and the deemphasis circuit 34 will be described in more detail in conjunction with respective exemplary embodiments. Describing at first the emphasis circuit 15, reference is made to FIG. 3a which is a circuit diagram showing a typical example of the emphasis circuit 15. In the figure, a reference symbol 15a denotes a chrominance signal input terminal, 151 denotes a differential amplifier circuit composed of paired differential transistors $Q_1$ and $Q_2$, resistors $R_4$ to $R_6$ and others, and a reference numeral 152 denotes a load circuit which is constituted by the paired differential transistors $Q_1$ and $Q_2$, resistors $R_1$ to $R_3$, diodes $D_1$ and $D_2$, a trap circuit including inductance $L_1$, a capacitor $C_1$ and others. The trap circuit composed of the inductance $L_1$ and the capacitor $C_1$ cooperates with the diodes $D_1$ and $D_2$ to constitutes a non-linear emphasis circuit. A symbol 15b denotes a chrominance signal output terminal.

With the circuit arrangement described above, the chrominance signal supplied to the input terminal $15a$ is led to the output terminal $15b$ after having been amplified through the amplifier circuit 151. Input/output gain at that time is such as described below.

When the chrominance signal applied to the input terminal $15a$ is of small amplitude, as the result of which the voltage applied to the diodes $D_1$ and $D_2$ constituting the load circuit 152 is lower than the threshold voltages of these diodes, the diodes $D_1$ and $D_2$ are in the cut-off state. Accordingly, for a frequency ($f_{SC} \pm 500$ KHz) spaced sufficiently from the resonance frequency ($f_R = \frac{1}{2}\pi\sqrt{L_1C_1}$) of the trap circuit ($C_1$, $L_1$), the gain is given by $(R_2+R_3)/(R_4+R_5)$. For the frequency $f_{SC}$ equal to the resonance frequency $f_R$, the gain is equal to $R_3/(R_4+R_5)$ since the series impedance of the trap circuit ($C_1$, $L_1$) is then zero. Accordingly, by selecting the resonance frequency $f_R$ of the trap circuit equal to the subcarrier frequency $f_{SC}$ of the chrominance signal (which is ca. 258 MHz according to the NTSC standard and ca. 443 MHz according to the PAL standard), the output signal proportional to the resistance $R_3$ is obtained for the input frequency of $f_{SC}$, while the output signal is in proportion to the resistance $(R_2+R_3)$ for the input frequency of $(f_{SC} \pm 500$ KHz). This means that the side band of the chrominance signal is emphasized.

Further, when the input chrominance signal is of sufficiently great amplitude, the diodes $D_1$ and $D_2$ become conductive alternatively for the chrominance signal (for half-waves of AC), resulting in that the AC impedance in appearance across the anti-parallel connection of the diodes $D_1$ and $D_2$ is substantially equal to zero. Accordingly, in this case, the gain in concern is $R_3/(R_4+R_5)$ regardless of the input frequency, which means that no emphasis is performed.

In brief, it will be understood that the sideband of the chrominance signal is emphasized or not in a dynamic manner in dependence on magnitude of the input amplitude.

In a numerical example where $R_1=R_2=560\Omega$, $R_3=100\Omega$, $R_4=R_5=47\Omega$, $C_1 \approx 9$ pF, $L_1=150$ $\mu$H, $E_1=2.5$ V, $R_6=4.7$ K$\Omega$, $J_1=4.0$ mA and $V_{CC}=5.0$ V, wherein a Schottky diode is employed as $D_1$ and $D_2$ and the maximum value of the input amplitude is 350 mV$_{pp}$, there are obtained such characteristics as illustrated in FIG. $3b$.

Figure 4:
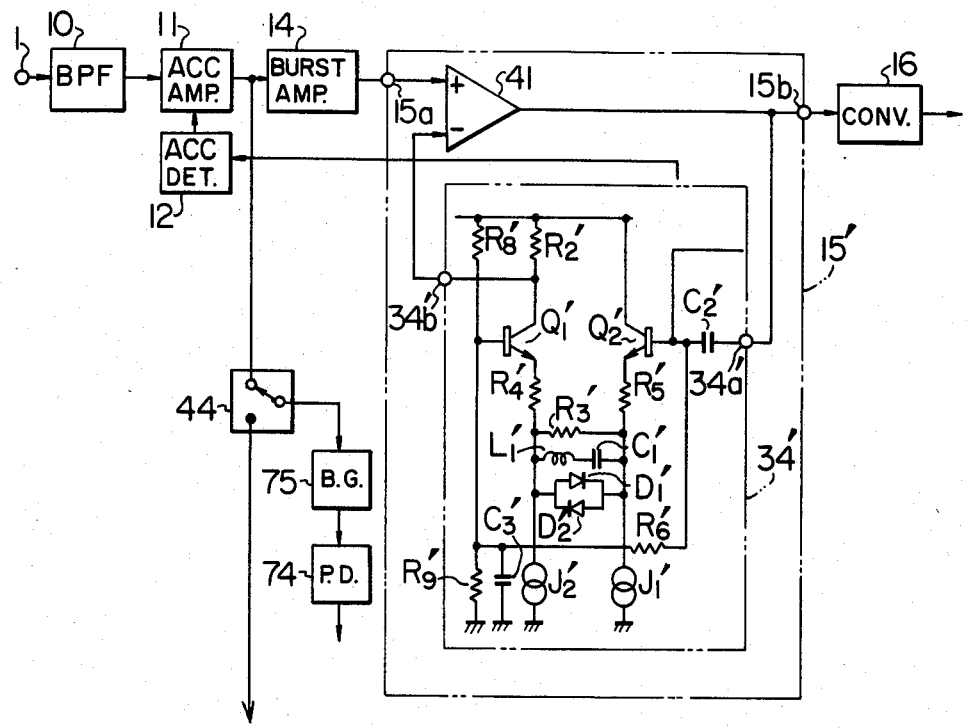

FIG. 4 shows another embodiment of the emphasis circuit. Referring to the figure, an emphasis circuit $15'$ is constituted by a circuit $34'$ imparted with a deemphasizing function (detail of which will be described hereinafter) and a differential amplifier 41. When the transfer characteristic of the circuit $34'$ is represented by $H'(\Omega)$, the transfer characteristic of the emphasis circuit $15'$ is given by $1/H'(\Omega)$ and reciprocal to that of the deemphasis circuit $34'$ when the gain of the differential amplifier 41 is of a large value. In this connection, it is necessary to make the level of output signal of the differential amplifier 41 coincide with that of the input chrominance signal. To this end, the level of the burst signal may be controlled to a predetermined value with the aid of the ACC detector 12 and an ACC amplifier 11.

Figure 5:
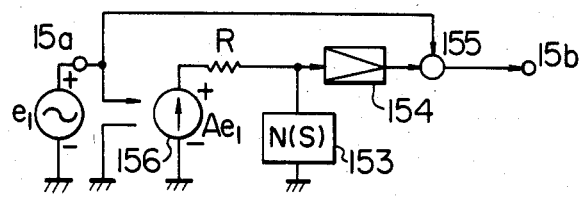

FIG. 5 shows an emphasis circuit which is arranged such that the input signal (chrominance signal) is added with the signal output from a non-linear circuit for emphasis to thereby emphasize the side band of the input signal. In this figure, $e_1$ represents a signal voltage source, $15a$ denotes an input terminal of the chrominance signal emphasizing network, and a numeral 156 denotes a voltage-controlled voltage source (hereinafter referred to as VCV), 153 denotes the non-linear circuit for emphasis which may be constituted, for example, by the diodes $D_1$ and $D_2$, inductance $L_1$, the capacity $C_1$ and others shown in FIG. $3a$, 154 denotes a buffer circuit, 155 denotes an adder circuit, R denotes a resistor which provides driving impedance to the non-linear circuit 153 and determines Q ($=\omega L_1/R$), and $15b$ denotes the output terminal of the chrominance emphasizing network.

With the circuit arrangement described above, a voltage $A \cdot e_1$ makes appearance across the VCV 156 due to the signal voltage source $e_1$ (where A represents an amplification factor of the VCV 156). The resistor R and the non-linear circuit 153 constitute the load to this voltage $A \cdot e_1$, to thereby produce a voltage signal at the input of the buffer circuit, which represents the chrominance signal containing only the side-band component as the result of suppression of the chrominance subcarrier frequency component and which is limited in respect to the maximum signal level. This signal is extracted by way of the buffer circuit 154 to be supplied to the adder circuit 155 where it is added with the original signal $e_1$. Accordingly, the signal obtained from the output terminal $15b$ is emphasized in respect to the side band, wherein the degree of emphasis becomes greater, as the level of the side band of the original signal is lower. In other words, there can be obtained the chrominance signal whose side band is emphasized dynamically in dependence on the level of the side band. The signal having undergone the emphasizing processing in this way is caused to pass through the deemphasis circuit or network imparted with the reverse characteristic and provided in the reproducing channel, whereby the S/N ratio of the chrominance signal of low side-band level can be improved. When the transfer function of the path extending from the VCV 156 to the output of the buffer circuit 154 is represented by G(S, a) where a represents the input level, the transfer function of the emphasis network is given by $$1+G(S, a)$$

The non-linear circuit 154 may be realized in such a configuration as shown in FIG. 6. Referring to FIG. 6, $C_2$ denotes a capacitor for cutting off the DC component, $R_1$ to $R_5$ denote resistors, $Q_1$ and $Q_2$ denote transistors, and $L_2$ denotes inductance for conducting the DC component. In this circuit configuration, dimensioning is made such that the ratio $R_3/R_4$ is about 3. In this circuit arrangement, the effect of change in impedance of the diodes can be taken advantage of, even when the input signal level does not vary significantly, to thereby allow the circuit to be operated even at low input level.

Figure 7:
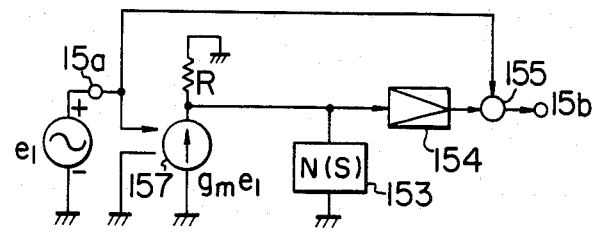

FIG. 7 shows a modification of the emphasis circuit shown in FIG. 5 in which the VCV 156 of the latter is replaced by a voltage-controlled current source 157 (hereinafter referred to as VCC in abridgement). The remaining portion of the circuit shown in FIG. 7 is utterly identical with the corresponding portion of the circuit shown in FIG. 5. Referring to FIG. 7, a current $g_m \cdot e_1$ is generated through the VCC 156 due to the signal voltage source $e_1$, where $g_m$ represents conversion transconductance of the VCC 157. When $g_m = A/R$, then the VCC 157 and the resistor R are exactly equivalent to the VCV 156 and the resistor R, respectively, from the law of equivalent source (i.e. in consideration of equivalency of source). Accordingly, the circuit operation is utterly the same as that of the embodiment shown in FIG. 5.

Figure 8:
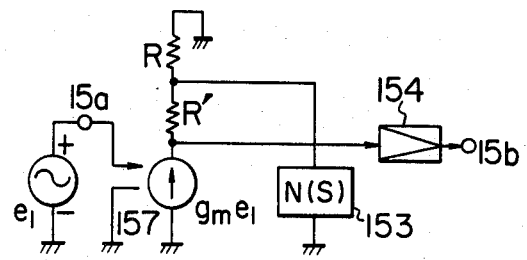

FIG. 8 shows a further exemplary embodiment of the emphasizing circuit. In this figure, R' denotes a resistor. In this circuit, selection is made such that $g_m = A/R$ and $R' = R/A$. On the condition, the voltage VR' produced across the resistor R' is given by $$VR' = g_m \cdot e_1 \cdot R' = \frac{A}{R} \cdot e_1 \frac{R}{A} = e_1$$

Thus the signal obtained from the output terminal 15b literally corresponds to the sum of the voltage produced across the resistor R' added with $e_1$, as is in the case of the circuit shown in FIG. 7. The circuit shown in FIG. 8 brings about an additional advantage that the adder circuit 155 can be spared to simplify the circuit configuration.

Next, exemplary embodiments of the deemphasis circuit 34 will be described.

Figure 1:
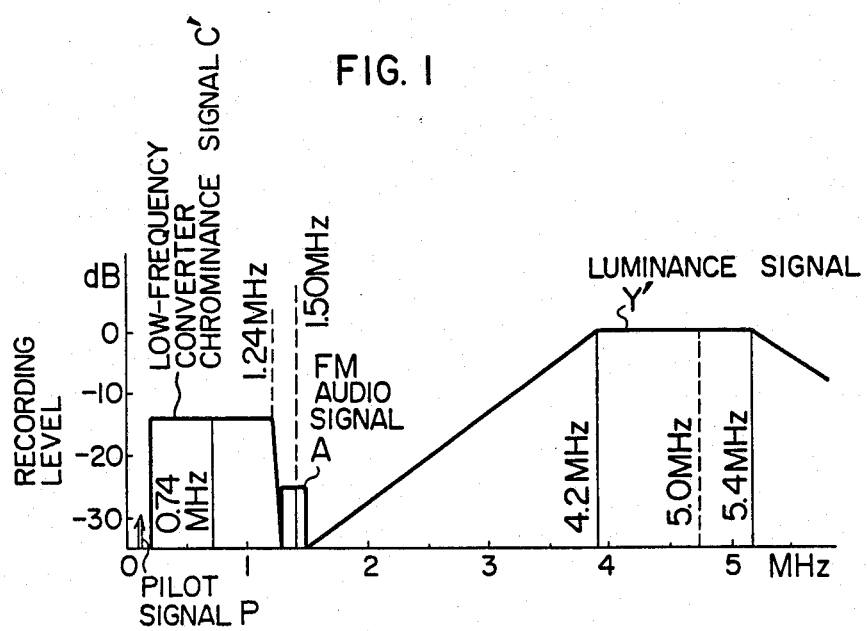
FIG. 1 is a view for illustrating frequency spectra of luminance signal, chrominance signal and others.
Figure 3A:
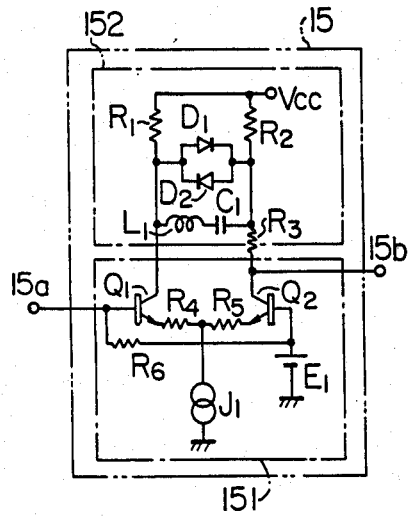
FIGS. 3a and 3b are views illustrating an arrangement and operation of an emphasis circuit according to an embodiment of the invention.

FIG. 9a shows an embodiment of the deemphasis circuit which is imparted with the characteristic reverse to that of the emphasis circuit 15 shown in FIG. 3a and which is composed of a trap circuit including $L'_1$ and $C'_1$ and connected in parallel with an anti-parallel connection of diodes $D'_1$ and $D'_2$. In FIG. 9a, 34a denotes an input terminal for the chrominance signal, 34b denotes a chrominance signal output terminal of the deemphasis circuit, $R'_1$ to $R'_5$ represent resistors, $Q'_1$ and $Q'_2$ represent transistors, $C'_1$ is a capacitor, $L'_1$ is an inductance, $D'_1$ and $D'_2$ are diodes, $J'_1$ and $J'_2$ represent current sources, and $E'_1$ represents a voltage source.

With the circuit arrangement illustrated above, input/output gain for a chrominance signal applied to the input terminal is given by $R'_4/R'_3$, provided that amplitude of the input signal is small and that the frequency is sufficiently distanced from the resonance frequency $f_R$ of the trap circuit ($C'_1$, $L'_1$), while the gain in concern is given by $$\frac{R'_1}{(R'_4 + R'_5)//R'_3}$$

when the input frequency is at the reference frequency. Accordingly, by selecting the resonance frequency $f_R$ of the trap circuit equal to the subcarrier frequency $f_{SC}$ of the chrominance signal, the side band can be deemphasized. On the other hand, when the amplitude of the input chrominance signal is sufficiently great, the gain in concern is given by $$\frac{R'_1}{(R'_4 + R'_5)//R'_3}$$

regardless of the input frequency, whereby no deemphasis is performed. In this way, deemphasis is made dynamically in dependence on magnitude of the input amplitude. It should be noted that similar characteristic can be attained even when the resistor $R'_3$ is omitted with a view to increasing Q.

FIG. 10 shows in a circuit diagram a deemphasis circuit 34' constituted by an improved emphasis circuit 15' corresponding to the one 15 shown in FIG. 3a and a differential amplifier 41 connected in the manner as shown together with peripheral circuits. In FIG. 10, same parts as those shown in FIG. 3a are denoted by like reference symbols and description thereof is omitted. In the deemphasis circuit 34' shown in FIG. 10, when the transfer characteristic of the circuit 15' exhibiting the emphasizing function is represented by $H(\omega)$, the transfer characteristic of the deemphasis circuit 34' is given by $$\frac{G}{1 + GH(\omega)}$$

where G represents gain of the differential amplifier 41. When $G >> O$, the transfer characteristic is $$\frac{1}{H(\omega)},$$

which is reciprocal or reverse to that of the circuit 15'. In this case, it is necessary to make the output signal level of the differential amplifier 41 coincide with the input chrominance signal level of the circuit 15'. To this end, the level of burst signal may be controlled to a predetermined value through the ACC detector 12 and the ACC amplifier 11.

FIG. 11 shows another embodiment of the deemphasis circuit having a characteristic reverse or reciprocal to that of the emphasis circuit shown in FIG. 5. In FIG. 11, $e_1$ designates a signal voltage source, 34a designates an input terminal of the chrominance signal deemphasizing circuit, 341 denotes an adder circuit, and 31b designates an output terminal of the chrominance deemphasizing circuit, wherein the transfer function of the path extending from the input of the VCV 156 to the output of the buffer circuit 154 is represented by G(S, a) where a represents the input signal level, the transfer function of the deemphasis circuit is given by $$\frac{1}{1 + G(S,a)}.$$

FIG. 12 shows a modification of the emphasis circuit shown in FIG. 7 which is implemented in a feedback configuration.

FIG. 13 shows in a circuit diagram still further embodiments of the emphasis circuit and the deemphasis circuit, respectively. In the figure, 151 and 152 denote limiter circuits, respectively, 153 denotes an adder and 154 denotes a subtraction circuit. The emphasis circuit 15 is constituted by the limiter circuit 151 and the adder 152. Suffixed symbols designate transistors, R denote resistors, C denotes capacitors, L denote inductors, D denote diodes, E denote DC voltage source and J denote DC current sources.

A chrominance signal applied to the terminal 15a is supplied to a differential amplifier constituted by the paired transistors $Q_1$ and $Q_2$. The values of the inductor $L_1$ and the capacitor $C_1$ connected between the collectors of the transistors $Q_1$ $Q_2$ are selected so that resonance takes place at the frequency $f_{SC}$ of the chrominance subcarrier, whereby a trap circuit is realized. The chrominance signals of frequencies in the vicinity of the frequency $f_{SC}$ produce no voltage on the base of the transistor $Q_3$ of the adder circuit 153. At the time the input signal is of large amplitude, the diodes $D_1$ and $D_2$ are short-circuited, whereby a voltage corresponding to the forward conduction voltage of the diodes $D_1$ and $D_2$ is produced at the base of the transistor $Q_3$ independent of the amplitude of the input signal. The paired transistors $Q_3$ and $Q_4$ constitute a differential amplifier which functions to add together the chrominance signal appearing at the terminal 15a and the output signal of the limiter circuit 151. When the input signal is of small amplitude, the diodes $D_1$ and $D_2$ are both opened, whereby the signal obtained from the trap circuit ($L_1$, $C_1$) and having a frequency detuned from the frequency $f_{SC}$ of the chrominance subcarrier is added with the chrominance signal applied to the terminal 15a through the adder 152. In this way, the desired emphasis characteristic can be attained.

The deemphasis circuit 34 is constituted by the subtraction circuit 154 and the limiter circuit 152. Suffixed symbols Q represent transistors, R resistors, C capacitors, L inductors, D diodes, E represent DC voltage sources, and J represent DC current sources.

The chrominance signal appearing at the terminal 34a is supplied to the paired differential transistors $Q_5$ and $Q_6$ by way of the capacitor $C_6$ of the subtraction circuit 154. On the other hand, a signal making appearance across the load resistor $R_{17}$ is negatively fed back to the substraction circuit 154 through the transistors $Q'_1$ and $Q'_2$ of the limiter circuit 152. The subtraction circuit 154 serves to subtract the output signal of the limiter circuit 152 from both signals mentioned above.

When the transfer characteristic of the limiter circuit 152 is represented by $H(\omega)$, the transfer characteristic of the emphasis network 15 can be given by $$\frac{1}{1 + H(\omega)},$$

while that of the deemphasis network 34 is given by $$\frac{1}{1 + H(\omega)}.$$

In the case of the embodiment shown in FIG. 13, level of the input chrominance signal to the emphasis network 15 is controlled to a predetermined constant value by means of the ACC detector 12 and the ACC amplifier 11. On the other hand, the chrominance signal level input to the deemphasis circuit 34 is controlled to a predetermined constant value by the ACC detector 32 and the ACC amplifier 31. Further, since the deemphasis circuit 34 is implemented in a negative feedback circuit configuration, it is required to control the input signal to the limiter circuit 152, that is, the base signal of the transistor $Q'_1$, in order to match the characteristic of the emphasis network 15 with that of the deemphasis network 34. In this connection, it is important that the emphasis circuit coincides with the deemphasis circuit in respect to the point at which the signal level is made constant. For example, in the case of the embodiments except for the one shown in FIG. 13, arrangement may be made such that the chrominance signal at the terminal 15b of the emphasis circuit 15 can be controlled to a predetermined constant value, while the chrominance signal at the terminal 34a of the chrominance deemphasizing circuit be controlled to a predetermined constant value.

In the foregoing description of the various embodiments of the invention, it has been assumed that the reference burst signal of the carrier signal generating circuit 60 is derived on the basis of the output signal of the ACC amplifier 11 in the recording mode, while the reference burst signal is derived on the basis of the output signal of the chrominance signal deemphasizing circuit 34 in the reproduction or playback mode. This is because the high-frequency component of the burst signal is imparted with a delay by the emphasis circuit 15, whereby the width of the burst signal is in substance widened. In other words, the reference burst signal of the carrier signal generating circuit 60 may be obtained at the stage preceding to the emphasis circuit in the recording operation, while it may be obtained at a stage succeeding to the deemphasis circuit in the reproducing operation.

It will now be appreciated that by virtue of such arrangement that the chrominance signal undergoes the emphasis processing through the emphasis circuit upon recording while it is subjected to the deemphasis processing by the deemphasis circuit upon reproduction, original signal component can be reconstituted with noise component being reduced by an amount corresponding to the deemphasis.

FIG. 14 shows still another embodiment of the invention in which both the ACC detector and the ACC amplifier are commonly used in both recording and reproducing operations. In this figure, the same parts as those shown in FIG. 2 are attached with like reference numerals and description thereof will be omitted. The circuit arrangement shown in FIG. 14 differs from the one shown in FIG. 2 in that a switch circuit 154, a recording burst amplifier 51 and a reproducing burst amplifier 50 are additionally provided, whereby the ACC detector 12 is used in common in both the recording and the reproducing operation, and that switch circuits 43 and 46 are additionally provided, to allow both the ACC amplifier 11 and the BPF to be used in both recording and reproducing operations.

In the circuit arrangement shown in FIG. 14, the reproduced signal produced by the reproducing head is supplied to the converter 36 through the LPF 30 to control the level of the output signal from the converter 36 for accomplishing the ACC (i.e. automatic chrominance signal control). Accordingly, the level of the input signal to the converter 36 would be fluctuated in dependence on fluctuation in the reproduced level of the output signal of the head and become varied among the channels. However, this provides practically no problems because the input level to the deemphasis circuit 34 is finally controlled to a predetermined level.

Upon recording, the input signal to the emphasis circuit 15 is supplied to the ACC detector 12 through a burst amplifier 50, while upon reproduction the output signal from the deemphasis circuit 34 is coupled to the ACC detector 12 by way of a burst amplifier 50. Although these burst amplifiers 50 and 51 should preferably be provided in consideration of the fact that the input levels of the emphasis circuit and deemphasis circuit are not always equal to each other in the recording and reproducing operations, they are not always indispensable from the standpoint of design.

In the case of the exemplary embodiments described so far, the emphasis processing and the deemphasis processing are carried out separately by the respective circuits or networks. It is however possible to perform both of these processings with a single common circuit.

Next, description will be made about a combined emphasis/deemphasis circuit arrangement which serves for the emphasis in the recording operation while it serves for the deemphasis in the reproducing operation.

FIG. 15 shows a still further embodiment of the invention in which the emphasis circuit 15 shown in FIG. 3a is made use of as the emphasis circuit in the recording operation while it is used as the deemphasis circuit for the reproduction. Referring to FIG. 15, reference symbols 15a and 15b denote input and output terminals, respectively, which are used in the recording operation, while 34a and 34b denote, respectively, input and output terminals used in the reproducing operation. Numeral 41 denotes a high-gain amplifier, and 42 denotes a recording/reproduction change-over switch circuit. The circuits 41 and 42 cooperate to constitute a combined emphasis/deemphasis circuit 40.

Referring to FIG. 15, the switch of the switch circuit 42 is changed over to a terminal or contact R for the recording upon recording operation. Then, the chrominance signal applied to the input terminal 15a is supplied to the emphasis circuit 15 by way of the switch circuit 42, to undergo the emphasizing processing described hereinbefore, the emphasized signal being led to the output terminal 15b.

When the switch of the switch circuit 42 is changed over to a reproducing or playback terminal P upon reproduction, the chrominance signal applied to the input terminal 34a is supplied to a plus (+) terminal of the amplifier circuit 41 to be amplified. The output signal of the amplifier circuit 41 is fed to the output terminal 34b and at the same time supplied to the emphasis circuit 15. After having being deemphasized by that circuit 15, the deemphasized chrominance signal is applied to a minus (−) terminal of the amplifier circuit 41. When the transfer function of the emphasis circuit 15 is represented by G(a, ω) (where a represents input amplitude and ω represents input frequency), while gain of the amplifier circuit 41 is represented by A, the transfer function $G_B(a, \omega)$ of the path extending from the input terminal 34a to the output terminal 34b is given by the following expression:

$$G_B(a,\omega) = \frac{A}{1 + AG(a,\omega)} \quad (1)$$

It will thus be understood that the chrominance signal emphasizing circuit 15 mentioned above serves as the deemphasis circuit having characteristic reciprocal to the emphasis characteristic elucidated hereinbefore.

FIG. 16 is a circuit diagram showing a concrete circuit configuration for implementing the circuit function described above in conjunction with FIG. 15. In this figure, $E_1$ to $E_5$ denote voltage sources, $R_1$ to $R_{21}$ denote resistors, $Q_1$ to $Q_{18}$ denote transistors, $C_1$ to $C_8$ denote capacitors, $D_1$ and $D_2$ denote diodes, $L_1$ denotes an inductor, and $S_1$ and $S_2$ denote switch circuits, respectively.

Figure 3B:
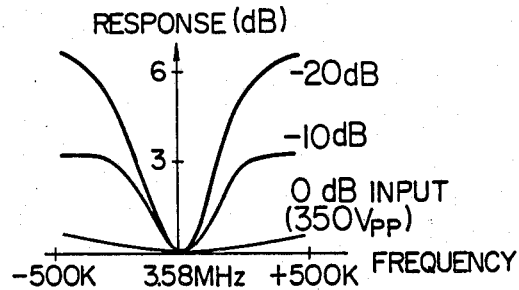

Upon recording operation, the switches $S_1$ and $S_2$ of the switch circuit 42 are changed over to the respective recording terminals or contacts R, whereupon a bias is applied to the base of the transistor $Q_4$ of the amplifier circuit 41 with the transistor $Q_4$ being turned on, as the result of which the transistors $Q_{13}$ and $Q_{14}$ are also turned on. On the other hand, the transistor $Q_3$ is turned off with the transistors $Q_{11}$ and $Q_{12}$ being turned off. Consequently, the chrominance signal applied to the input terminal 15a makes appearance across the resistor $R_{13}$ by way of the base of the transistor $Q_{14}$. The signal applied to the base of the transistor $Q_{11}$ does not make appearance at the resistor $R_{13}$. The chrominance signal making appearance at the resistor $R_{13}$ is supplied to the paired differential transistors $Q_{16}$ and $Q_{17}$ by way of the emitter follower transistor $Q_{15}$ of the circuit 15. Applied to the base of the transistor $Q_{17}$ is only the DC component because the chrominance signal is substantially attenuated by a low-pass filter constituted by the resistor $R_{17}$ and the capacitor $C_7$. As the consequence, the output signal produced at the collector of the transistor $Q_{17}$ is in phase with the chrominance signal applied to the base of the transistor $Q_{16}$, while the output signal of the phase opposite to that of the chrominance signal is produced at the collector of the transistor $Q_{16}$. The resistors $R_{18}$ to $R_{21}$, diodes $D_1$ and $D_2$, the inductor $L_1$ and the capacitor $C_6$ serve for the same functions as elucidated hereinbefore in conjunction with FIG. 3. In this way, the emphasized chrominance signal is produced at the output terminal 15b from the collector of the transistor $Q_{17}$ by way of the emitter follower transistor $Q_{18}$. On the other hand, when the switches $S_1$ and $S_2$ of the switch circuit 42 are changed over to the reproducing or playback terminal P as shown in FIG. 16 to turn off the transistor $Q_3$ with the transistor $Q_4$ being thereby turned off, the reproduced chrominance signal applied to the input terminal 34a is supplied to the base of the positive-phase (+) input transistor $Q_8$ of the differential amplifier constituted by the paired transistors $Q_8$ and $Q_9$, the output signal of the transistor $Q_8$ being led to the output terminal 34b by way of the emitter follower transistor $Q_{10}$. This path corresponds to the path extending from the input terminal 34a to the positive input terminal (non-inverting input terminal) of the amplifier circuit 41 shown in FIG. 15.

The chrominance signal is supplied to the resistor $R_{13}$ by way of the transistors $Q_{11}$ and $Q_{12}$ to be supplied to the emphasis circuit constituted by the emitter follower transistor $Q_{17}$ and the paired differential transistors $Q_{16}$ and $Q_{17}$. Subsequently, the chrominance signal is supplied to the base of the transistor $Q_9$ for the opposite phase input (inverting input) of the differential amplifier constituted by the paired transistors $Q_8$ and $Q_9$. The path constituted by these elements corresponds to the path which is branched from the output of the amplifier circuit 41 and extends through the switch circuit 42 and the emphasis circuit 15 to the opposite phase (−) input of the amplifier circuit 41 shown in FIG. 15.

FIG. 17 shows in a block diagram an exemplary embodiment of the chrominance signal recording/reproducing circuit in which the chrominance emphasis circuit shown in FIG. 3a is adapted to be used for the deemphasis as well.

Referring to FIG. 17, the switch circuits 42 to 46 and 76 are thrown to the respective recording terminals R upon recording operation, while they are changed over to the reproducing (playback) terminals P upon reproduction.

In the first place, recording operation will be described. A video signal to be recorded is supplied through the input terminal 1 and the switch circuit 43 to the BPF 10, the ACC amplifier 11 and the ACC detector 12, The BPF 10 serves to select out the chrominance signal C from the video signal to be recorded. The chrominance signal thus selected is supplied to the burst emphasis circuit 14 through the switch circuit 46. The burst emphasis circuit 14 is usually so conditioned that only the level of the burst signal is emphasized about 6 dB. The chrominance signal having undergone the burst emphasis in the burst emphasis circuit 14 is supplied to the emphasis circuit 15 of the combined emphasis/deemphasis circuit 40 to be emphasized by the circuit 15 in the manner described hereinbefore. The output signal of the circuit 40 is supplied to the frequency conversion circuit 16 (hereinafter also referred to simply as converter) where it is mixed with the frequency supplied from the carrier signal generating circuit 60 through the converter 71 and the BPF 72 to be converted to the low-frequency chrominance signal C', which is subsequently mixed with the FM-modulated luminance signal, FM-audio signal and the pilot signal for the tracking control described hereinbefore through the LPF 17, the resultant signal being recorded on the magnetic head by the magnetic head.

A reference numeral 75 denotes a burst gate circuit for extracting only the burst signal. In the recording operation, the output signal of the ACC amplifier 11 is supplied to a phase detector 74 by way of the switch circuits 46, 44 and the burst gate circuit 75. The phase detector 74 produces as the output a DC signal which corresponds to difference in phase between the oscillation frequency signal produced by a voltage-controlled oscillator 73 (hereinafter referred to as VCO) and the output signal of the burst gate circuit 75, to thereby control with the DC signal the oscillation frequency $f_{VCO}$ (first carrrier) of the VCO 73 so as to coincide with the chrominance carrier frequency $f_{SC}$. A reference numeral 62 denotes an input terminal for a horizontal synchronizing signal or equivalent signal, 64 denotes a phase detector, and 65 denotes a 1/n-frequency division circuit. These components constitute a PLL circuit together with the VCO 69. The oscillation frequency of the VCO 69 is given by n·fH (where fH represents the horizontal scanning frequency). A reference numeral 66 denotes a ⅛-frequency dividing circuit for dividing the output frequency of the VCO 69 by 8, to thereby generate such a second carrier signal that the chrominance signal to be recorded has a predetermined frequency offset in a phase shift circuit 67. The second carrier signal is mixed with the aforementioned first carrier signal through a converter 71. The BPF 72 extracts the sum signal of the first and second carrier signals, which signal is supplied to the converter 16. The latter then functions to derive the chrominance signal frequency for the recording (i.e. low-frequency converted chrominance signal C') which is equal to the second carrier frequency mentioned above.

Next, description will be made of the reproducing operation.

The signal reproduced through the reproducing head is supplied to the converter 36 by way of the LPF 30 to be mixed with the frequency applied by the BPF 72, whereby the low-frequency converted signal C' is converted to the chrominance signal C of normal frequency band. The chrominance signal C is supplied to the comb filter 37 through the switch circuits 46 after having been selectively amplified through the path including the switch circuit 43, the BPF and the ACC amplifier. The comb filter circuit 37 serves to eliminate the cross-talk signal from the adjacent track. The chrominance signal passed through the comb filter 37 is supplied to the circuit 40 which operates at this time as the deemphasis circuit for the chrominance signal to cancel the amount of emphasis performed in the recording operation, as described hereinbefore. The deemphasized chrominance signal is so processed by a burst deemphasis circuit 35 that the level of the burst signal before the emphasis for the recording be restored. The output chrominance signal of the burst deemphasis circuit 35 is mixed with the reproduced luminance signal to reconstitute the video signal.

The reproducing operation differs from the recording operation in that the switch circuit 44 is thrown to the reproducing or playback terminal P, whereby the output signal of the combined emphasis/deemphasis circuit 40 is supplied to the phase detector 74 by way of the switch circuit 44 and the burst gate circuit 75, the switch circuits 76 and 61 are thrown to the respective reproducing terminals P, whereby the output signal of the phase detector 76 controls the VCO 69 by way of a frequency discriminator circuit 63, and that the VCO 73 is caused to freely oscillate at a frequency $f_{SC}$ approximately equal to that of the chrominance signal, to thereby produce the first carrier. The converter 36 serves to restore the chrominance signal of the frequency equal to that of the first carrier.

According to the NTSC standards, the frequency of the low-frequency converted chrominance signal has to satisfy the conditions that it must have an offset equal to ½ $f_H$ multiplied by an odd number between the fields and an offset of ¼ $f_H$. For example, when the low-frequency converted chrominance signal or the second carrier has a frequency of $(47+¼) f_H$, the oscillation frequency of the VCO 69 is then $(47+¼) f_H \times 8 = 378 f_H$. Accordingly, the divisor n of the frequency division circuit 67 is selected equal to 378. To produce the frequency offset between the fields, the phase shift circuit 67 inverts the phase of the second carrier signal of one of the fields by 180° for every horizontal period.

According to the PAL standards, it is required that the low-frequency converted chrominance signal has an offset equal to ¼ $f_H$ multiplied by an odd number between the fields and an offset of ⅛ $f_H$. For example, when the low-frequency converted chrominance signal i.e. the second carrier has a frequency of $(47-⅛) f_H$, the oscillation frequency of the VCO 69 is $(47-⅛) f_H \times 8 = 375 f_H$. Accordingly, the divisor n of the 1/n frequency division circuit 67 is selected equal to 375. The phase shift circuit 67 advances or delays the phase of the second carrier of the one field by 90° for every horizontal period.

The low-frequency converted chrominance signal is recorded/reproduced at the frequencies which satisfy the requirements imposed by the NTSC and PAL standards mentioned above by virtue of the frequency offset of the second carrier.

With the circuit arrangements according to the invention as described above, noise mixedly present in the chrominance signal can be reduced while the S/N ratio of the reproduced chrominance signal can be improved. Further, because a single circuit serves for the emphasizing and deemphasizing functions exchangeably, increasing in the circuit dimension (scale) or expenditure therefor can be suppressed to a minimum. Besides, exchange of the emphasis circuit and the deemphasis circuit with each other can be accomplished in a facilitated manner.

FIG. 18 shows another embodiment of the invention in which the combined emphasis/deemphasis circuit is to be implemented by using the deemphasis circuit 34' shown in FIG. 10, and which differs from the circuit arrangement shown in FIG. 11 in respect that the emphasis circuit is replaced by the deemphasis circuit 34' and that the differential amplifier 41 and the switches 42 are connected in different manners.

Next, description will be made as to a circuit which serves for both the emphasis and the deemphasis and which requires no use of the high-gain amplifier 41.

Referring to FIGS. 19a to 19c, a numeral 15' denotes an emphasis circuit which corresponds to an improvement of the emphasis circuit 15 shown in FIG. 3a in which the value of the resistor $R_3$ is selected equal to zero. A numeral 53 denotes an adder, 54 denotes a subtraction circuit, and 52 denotes a record/reproduction change-over switch circuit. When the switch circuit 52 is thrown to the record terminal R, the system shown in FIG. 19b becomes effective. On the other hand, when the switch circuit 52 is thrown to the reproducing (playback) terminal P, the system illustrated in FIG. 19c becomes operative. In the system shown in FIG. 19b, the input/output gain is zero for an extremely small input signal at $f_R = f_{SC}$, while it is $R_2/(R_4+R_5)$ for the extremely small input signal at $f_R \pm 500 \text{ K} = f_{SC} \pm 500 \text{ K}$. For a large input signal, the gain is zero. In this way, although the side band is dynamically emphasized, the component $f_{SC}$ (frequency of chrominance subcarrier) is prevented from appearing in the output signal. Accordingly, by mixing (adding) the output signal with the input signal containing the component $f_{SC}$, the characteristic approximating the one illustrated in FIG. 3b can be realized. In this way, the system shown in FIG. 19 can serve as the side-band emphasizing circuit. Then, the system shown in FIG. 19c has the characteristic reciprocal to that of the system shown in FIG. 19b in view of the transfer function, to serve as the deemphasis circuit.

FIG. 20 is a circuit diagram showing, by way of example, a concrete circuit configuration of the system shown in FIG. 19a. In this figure, $Q_1$ to $Q_{31}$ denote transistors, $R_1$ to $R_{27}$ denote resistors, $C_1$ to $C_3$ denote capacitors. $L_1$ denotes an inductance, $D_1$ and $D_2$ denote Schottky diodes, $S_1$ and $S_2$ denote switch circuits, and $E_1$ denotes a voltage source.

Operation as the emphasis circuit in the recording mode will first be described. With the switch circuit $S_1$ and $S_2$ being thrown to the recording position as shown, the chrominance signal applied to the input terminal 15a is transmitted along the path extending from the base of the transistor $Q_{14}$ through the emitter thereof, the emitter of the transistor $Q_{13}$ and the collector thereof to the base of the transistor $Q_{17}$ under energization from the voltage source $E_1$. Further, the signal component takes the route extending from the emitter of the transistor $Q_{17}$ through the resistor $R_{12}$ and the base of the transistor $Q_{19}$ to the emitter thereof. Only the DC component produced at the emitter of the transistor $Q_{17}$ is transmitted through the base-emitter path of the transistor $Q_{14}$ to the base of the transistor $Q_{22}$. The paired differential transistors $Q_{21}$ and $Q_{22}$, the resistors $R_{15}$, $R_{16}$, $R_{17}$ to $R_{20}$, the capacitor $C_1$, the inductance $L_1$ and the diodes $D_1$ and $D_2$ constitute a main portion of the emphasis circuit 15'. The output signal produced at the collector of the transistor $Q_{22}$ is applied to the base of the transistor $Q_{23}$, after having been attenuated with a view to matching the output level with a predetermined value. The chrominance signal applied to the base of the transistor $Q_{21}$ is simultaneously applied to the base of the transistor $Q_{26}$. The base of the transistor $Q_{27}$ is at a reference DC potential. The signal appearing at the base of the transistor $Q_{27}$ is transmitted in phase to the collector of the transistor $Q_{27}$. In this conjunction, it is to be noted that since the signal applied to the base of the transistor $Q_{28}$ is transmitted to the collector of the transistor $Q_{27}$ by way of the emitter of the transistor $Q_{28}$, addition of two signals is performed. This corresponds to the operation of the adder 53 shown in FIG. 19a. The emphasized output signal is obtained at the output terminal 15b by way of the emitter follower circuit of the transistor $Q_{20}$.

Next, operation as the deemphasis circuit in the reproducing mode will be described. The chrominance signal applied to the input terminal 43a is led to the paired differential transistors $Q_4$ and $Q_5$ by way of the transistors $Q_1$ and $Q_2$. The base of the transistor $Q_5$ is supplied with only the reference DC potential with the AC component being cut off by the capacitor $C_3$. The output signal of the differential transistor circuit makes appearance at the collector of the transistor $Q_5$, which signal is added with the base signal of the transistor $Q_7$. This base signal of the transistor $Q_7$ is derived by attenuating the output of the transistor $Q_{21}$ by means of the resistors $R_{17}$ and $R_{18}$. Since the collector output of the transistor $Q_{21}$ is in the opposite phase to the base input of the transistor $Q_{19}$, the component which makes appearance at the collector of the transistor $Q_5$ is negative (of minus polarity) when considered with reference to the base signal of the transistor $Q_{19}$. This addition (equivalent subtraction) corresponds to the operation of the subtraction circuit 54 shown in FIG. 19a. The collector output of the transistor $Q_5$ is led to the output terminal 43b through the emitter follower circuit of the transitor $Q_9$. When the switch circuits $S_1$ and $S_2$ are changed over to the positions reverse to the illustrated ones, respectively, the collector output of the transistor $Q_5$ is transmitted to the base of the transistor $Q_{17}$ through the base-emitter junction of the transistor $Q_{10}$ and the collectors of the transistors $Q_{12}$ and $Q_{11}$. Subsequent operation is similar to that of the recording mode. However, the output corresponding to that of the circuit 15' is derived from the collector of the opposite phase output transistor $Q_{21}$, because the sign of the feedback is negative.

With the circuit arrangement described just above, the use of high-gain amplifier is rendered unnecessary, while no degradation is involved in the system stability based on the feedback (a loop assuring a high gain).

Figure 21A:
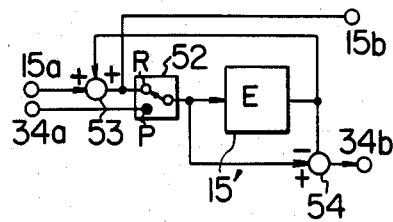
Figure 21B:
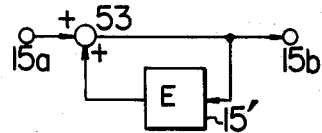
Figure 21C:
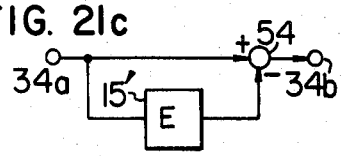

FIGS. 21a to 21c are block diagrams showing a still further embodiment of the invention in which a same circuit is employed exchangeably as the emphasis circuit and the deemphasis circuit. The emphasis curcuit system shown in FIG. 21b differs from the system shown in FIG. 19b in that addition with the input signal is performed through the emphasis circuit 15' in the emphasis system shown in FIG. 21b. In this case, the component $f_{SC}$ is corrected as well. FIG. 21c shows a deemphasis circuit system which exhibits the characteristic reverse to that of the system illustrated in FIG. 19c.

The system similar to those shown in FIGS. 19 and 21 may be realized by using the deemphasis circuit shown in FIG. 3a where the values of the resistors $R_4$ and $R_5$ are however selected equal to zero. Description of such system will be unnecessary, since it will readily occur to those skilled in the art.

The embodiments of the invention described above allow noise admixed in the chrominance signal to be reduced, whereby the S/N ratio of the reproduced chrominance signal is improved to a great advantage. Further, by virtue of the arrangement that a circuit can be commonly used as the emphasis circuit and as the deemphasis circuit, the scale of circuit or dimension can be prevented from being increased. Further, exchage of the functions of the emphasis circuit and the deemphasis circuit with each other can be easily realized.

Figure 22:
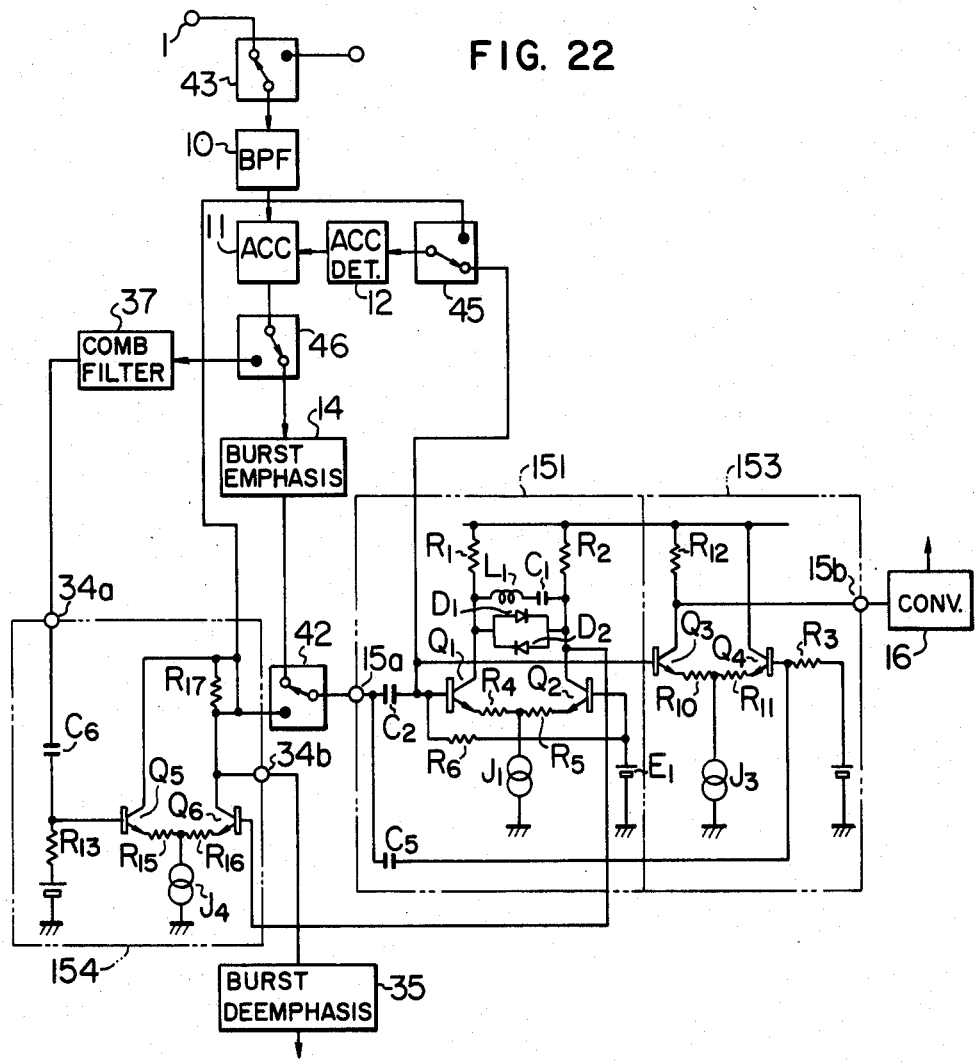

FIG. 22 shows a further embodiment of the present invention in which the emphasis circuit shown in FIG. 13 is rearranged so as to serve for both emphasis and deemphasis functions in an exchangeable manner. The embodiment shown in FIG. 22 differs from the emphasis circuit shown in FIG. 13 in that the ACC amplifier 11, the ACC detector 12 and the BPF 10 are employed in common in both of the recording and reproducing operations by virtue of provision of switch circuits 43, 45 and 46, and that the limiter circuit 151 can be commonly used in both the emphasis circuit and the deemphasis circuit by providing a switch circuit 42.

Upon recording, the switch circuits 43, 45, 46 and 42 are changed over to the respective positions R shown in FIG. 22.

The output signal of the burst emphasis circuit 14 is supplied from the terminal 15a to a differential amplifier ($Q_1$, $Q_2$) of a limiter circuit 151 and a differential amplifier ($Q_3$, $Q_4$) constituting an adder 153 by way of the switch circuit 42. The differential amplifier ($Q_1$, $Q_2$) performs limiting operation afforded by the diodes $D_1$ and $D_2$ for the input signal of high level, as described hereinbefore, to lead the output signal to the other terminal of the differential amplifier ($Q_3$, $Q_4$). The limiter circuit 151 and the adder 153 function as the emphasis circuit, as described hereinbefore, to output the emphasized chrominance signal of a predetermined level to the converter circuit 16. As this time, the input signal of the limiter circuit 151 is supplied to the ACC detector 12 to be controlled to the predetermined level.

In the reproducing operation, the switch circuits 43, 45, 46 and 42 are changed over to the positions P opposite to those shown in FIG. 22. The output signal from the comb filter 37 appearing at the terminal 34a is supplied to one of the terminals of the differential amplifier ($Q_5$, $Q_6$) which constitutes the subtraction circuit 154. The output signal of the differential amplifier ($Q_5$, $Q_6$) is supplied to the differential amplifier ($Q_1$, $Q_2$) is the limiter circuit 151 through the switch circuit 42 and the terminal 15a. The output signal of the limiter circuit 151 is negatively fed back to the other terminal of the differential amplifier ($Q_4$, $Q_4$) constituting the subtraction circuit 154. At that time, the limiter circuit 151 and the subtraction circuit 154 cooperate, as described hereinbefore, to output the deemphasized chrominance signal of the predetermined level which is then supplied to the burst deemphasis curcuit 35. At that time, the output signal of the subtraction circuit 154 is supplied to the ACC detector 12 to control that signal to a predetermined level. As will be readily obvious from FIG. 22, there is conceivable such an arrangement in which the switch circuit 45 is omitted, wherein the output signal of the switch circuit 42 is connected to the ACC detector 12 in both the recording and reproducing operations. It is only important to arrange such that the level of voltage applied to the diodes $D_1$ and $D_2$ which virtually perform the limiting operation be controlled to the predetermined level.

By controlling the characteristics of the emphasis circuit as well as the deemphasis circuit to respective predetermined levels by the ACC circuit in the manner described above, fluctuation or variation in the amount or degree of emphasis can be reduced. The ACC circuit may be constituted by a circuit element capable of performing the desired limiting operation. For example, the ACC circuit may be constituted by diodes connected so as to control the level of voltage applied thereto to a predetermined value. Of course, the circuit element adapted for the limiting operation is not restricted to those illustrated herein, but other elements such as transistors or combinations thereof may be employed within the spirit of the invention.

In the embodiments described above, the emphasis circuit for the chrominance signal is disposed downstream of the burst emphasis circuit, while the deemphasis circuit for the chrominance signal is disposed upstream of the burst deemphasis circuit. However, inversions of these connections may equally be adopted without impairing the effects provided by the invention.

With the embodiments described above, recording the reproduction of the video signal can be accomplished with an improved quality of the chrominance signal even in the application where the pilot signal and the FM audio signal are recorded on the track in frequency multiplex. Non-uniformity in the emphasis characteristic can be successfully suppressed by the ACC circuit, giving rise to no problem in practice. Further, by using the same circuit for the emphasis circuit in the recording mode and for the deemphasis circuit in the reproducing mode while using the same ACC circuit in both of the recording and reproducing operations, the chrominance signal recording/reproducing apparatus can be realized with high efficiency as viewed from the economical viewpoint (i.e. without involving high expensiveness).

Figure 23:
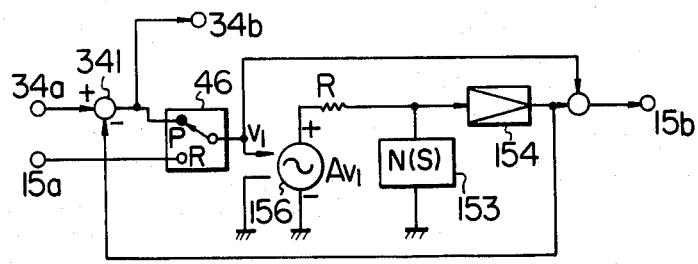

FIG. 23 shows an embodiment of the invention in which the emphasis circuit shown in FIG. 5 and the deemphasis circuit shown in FIG. 11 are implemented in a common circuit destined to serve for both the emphasizing function and the deemphasizing function exchangeably by changing over the switch circuit 46, while FIG. 24 shows a still further embodiment of the invention in which the emphasis circuit shown in FIG. 7 and the deemphasis circuit shown in FIG. 12 are implemented in a combined emphasis/deemphasis circuit. In FIG. 23, the same parts as those shown in FIG. 11 are attached with like reference symbols, and description thereof is omitted.

Referring to FIGS. 23 and 24, the output terminal 34b may be led out from the output terminal of the switch circuit 46. Further, the path extending from the output terminal of the switch circuit 46 to the adder circuit 155 may be alternatively led from the fixed terminal R corresponding to the recording position of the switch circuit 46 to the adder circuit 155.

FIG. 25 shows another embodiment in which the emphasis circuit shown in FIG. 8 and the deemphasis circuit shown in FIG. 12 are implemented in a combined emphasis/deemphasis circuit configuration. In the case of this embodiment, the adder circuit 155 is rendered unnecessary, to simplify the circuit configuration. Although the buffer circuit 157 is increased in number as compared with the arrangements shown in FIGS. 19 and 23, this involves substantially no complication, since the buffer circuit 154 can be easily implemented integrally with the subtraction circuit 341. Further, the output terminal 34b may be led out from the output terminal of the switch circuit 46.

Next, description will be made about the burst signal amplitude detection level for the ACC (automatic chrominance control) in the chrominance signal processing chain in which the combined chrominance signal emphasizing/deemphasizing circuit illustrated in FIGS. 23 to 25 is employed. The combined chrominance emphasizing/deemphasizing circuits according to these embodiments are nonlinear circuit whose frequency characteristic varies in dependence on the input level. Accordingly, it is necessary to prevent the input burst level from being fluctuated. Under the circumstance, the input level of the circuit functioning as the chrominance emphasis circuit in the recording operation is made use of as the burst signal amplitude detection level for the ACC for the matching of the input level. In this way, emphasis of the chrominance signal can be accomplished correctly with dynamic characteristic.

Further, in the reproducing operation in which the signal processings are carried out in the sequence reverse to the signal processing in the recording operation, the output of the combined circuit serving now as the chrominance signal deemphasizing circuit is used as the burst signal amplitude detection level for the ACC. In this way, the chrominance signal can be deemphasized satisfactorily with dynamic characteristic.

Finally, FIG. 26 shows a concrete embodiment of the combined chrominance signal emphasizing/deemphasizing circuit according to the invention. In this figure, reference symbols $Q_{11}$ to $Q_{39}$ denote transistors, $R_{11}$ to $R_{40}$ denote resistors, $D_{11}$ and $D_{12}$ denote Schottky diodes, $C_{11}$ to $C_{14}$ denote capacitors, $L_{13}$ and $L_{14}$ denote inductances, $S_1$ and $S_2$ denote record/reproduction change-over switch circuits, $E_1$ denotes a voltage source, and $P_1$, $P_2$ and $P_3$ denote pins of first, second and third integrated circuits, respectively. The circuit arrangement shown in FIG. 26 is based on the embodiment shown in FIG. 25.

Recording operation will first be described. When the switch circuit $S_1$ and $S_2$ are changed over to the positions opposite to these shown in the figure, the transistor $Q_{26}$ is turned on with the transistor $Q_{25}$ being turned off, whereby the signal from the input terminal 2 is transmitted to the bases of the transistors $Q_{23}$ and $Q_{27}$ through the base-emitter path of the transistor $Q_{24}$. Further, the signal is transmitted to the base of the transistor $Q_{31}$ from the emitter of the transistor $Q_{27}$ through the resistor $R_{25}$ and the base-emitter junction of the transistor $Q_{29}$. At the same time, a signal derived through voltage division of the emitter voltage of the transistor $Q_{27}$ by the resistors $R_{26}$ and $R_{37}$ is transmitted to the base of the transistor $Q_{32}$ through the base-emitter path or junction of the transistor $Q_{34}$. (A symbol $C_{12}$ denotes a bypass capacitor for cutting off the AC components). Accordingly, the signal input to the paired differential transistors $Q_{31}$ and $Q_{32}$ (i.e. differential amplifier) is $$\left(1 - \frac{R_{37}}{R_{37} + R_{26}}\right)$$

times as high as the input signal to the terminal 2. The paired differential transistors $Q_{31}$ and $Q_{32}$ constitute a voltage-controlled current source. The resistor $R_{30}$ corresponds to the resistor R' shown in FIG. 25, while the resistance $(R_{28}+R_{29})$ corresponds to the resistor R shown in FIG. 25. External attachment of the pin $P_1$ is made to the non-linear circuit 153. Accordingly, the signal produced at the collector of the transistor $Q_{31}$ may be led to the emitter follower circuit (hereinafter abbreviated to EF) of the transistor $Q_{16}$ and hence to the output terminal 15b. The adjustment of the value $g_m$ (or A) may be equivalently effected in terms of the value of the resistor $R_{37}$.

Next, operation of the reproducing mode will be described. The switch circuits $S_1$ and $S_2$ are changed over to the respective positions shown in FIG. 26. The signal applied to the input terminal 34a is led to the EF (emitter follower) of the transistor $Q_{11}$ and fed back to be added with the signal fed to the EF of the transistor $Q_{12}$ by means of the resistors $R_{11}$ and $R_{12}$ with attenuation. The resulted signal undergoes level shift through the EF of the transistor $Q_{15}$ and the transistor $Q_{16}$ to be subsequently inputted to the paired differential transistors $Q_{18}$ and $Q_{19}$ by way of the resistors $R_{15}$ and $R_{16}$. The output signal of the differential amplifier constituted by the paired transistors $Q_{18}$ and $Q_{19}$ makes appearance at the collector of the transistor $Q_{19}$. The value of the resistor $R_{36}$ is so adjusted that gain becomes 0 db in the course of attenuation and amplification mentioned so far. Effect of the capacitor $C_{11}$ will be described later on. The signal is subsequently transmitted to the bases of the transistors $Q_{22}$ and $Q_{27}$ in this order through the base-emitter path of the transistor $Q_{21}$. The succeeding operation which continues to the actuation of the paired differential transistors $Q_{31}$ and $Q_{32}$ is same as in the case of the recording operation. As the signal to be fed back, the signal attenuated by the resistors $R_{28}$ and $R_{29}$ is employed for the level matching with the input signal. The attenuation may be omitted by correspondingly setting the level of the input signal to the deemphasis circuit. The output signal in the reproducing operation is obtained at the output terminal 34b from the emitter of the transistor $Q_{21}$.

If the circuit illustrated in FIG. 25 could be realized ideally, the emphasis circuit and the deemphasis circuit would exhibit the characteristics which are perfectly reciprocal to each other. However, when they are implemented in a practical circuit configuration as shown in FIG. 26 and operated, there arises a phenomenon that the centers of the frequency characteristics of the emphasis circuit and the deemphasis circuit are deviated from each other. This phenomenon can be explained by the fact that a delay in phase is more or less involved in the feedback path due to capacitance of the transistors or for other causes. Accordingly, some kind of correcting measures must be taken to compensate the phase delay. To this end, there is adopted in the embodiment shown in FIG. 26 a correcting means which will be mentioned below. Namely, the capacitor $C_{11}$ is not used as the bypass capacitor in any strict sense but a slightly smaller value is selected for this capacitor $C_{11}$ so that the differential amplifiers constituted by the transistors $Q_{18}$ and $Q_{19}$ may operate with lead in phase which can compensate the delay in phase occurring in the feedback path. Then, the combined chrominance signal emphasizing/deemphasizing circuit which enjoys an excellent exchangeability can be realized. To this end, the capacitor $C_{11}$ and the resistor $R_{36}$ or the capacitor $C_{12}$ and resistors $R_{37}$ should be externally attached elements. In case no adjustment is required, they may be incorporated integrally in the integrated circuit.

From the viewpoint of the power economy or saving, circuit design should be made such that the collector currents of the individual transistors can be decreased. However, limitation is imposed to the increasing in the values of the resistors $R_{28}$ and $R_{29}$ which provide driving impedance to the serial resonance circuit ($C_{13}$, $L_{13}$), because the value of Q of the resonance circuit cannot be decreased excessively. Under the circumstance, so far as the transistors $Q_{31}$, $Q_{32}$ and $Q_{33}$ are concerned, the collector currents thereof can not be decreased excessively. Further, in the case of the embodiment in which the emphasis and deemphasis circuit portions are changed over in the recording and reproducing operations, arrangement may be made such that the transistors which play no part in the currently performed operation are turned off to thereby attain the power saving.

These embodiments mentioned above allow noise admixed in the chrominance signal to be reduced to improve the S/N ratio of the reproduced chrominance signal and thus the image quality of the reproduced picture, as is in the case of the embodiments described hereinbefore. Further, since the emphasis circuit and the deemphasis circuit can be realized in a common or combined circuit of a relatively simple structure, the scale of the circuit or dimension is prevented from becoming large. Besides, it is easy to implement the emphasis circuit and the deemphasis circuit in a reciprocal relationship.

We claim:

1. A chrominance signal recording and reproducing apparatus for a video tape recorder in which a luminance signal modulated in frequency is mixed with a low-frequency converted chrominance signal to be recorded and reproduced, comprising:
   emphasis means provided in a chrominance signal recording circuit chain for emphasizing side bands of said chrominance signal when said chrominance signal is at a low level; and
   deemphasis means provided in a chrominance signal reproducing circuit chain and having characteristic reciprocal to that of said emphasis means for deemphasizing said chrominance signal.

2. A chrominance signal recording and reproducing apparatus according to claim 1 wherein each of said emphasis circuit and said deemphasis circuit includes an amplifier for amplifying the chrominance signal and a load circuit connected to said amplifiers, said load circuit including a limiter circuit constituted by an antiparallel connection of diodes, and a trap circuit connected in parallel with said limiter circuit and designed to resonate at a subcarrier frequency of said chrominance signal.

3. A chrominance signal recording and reproducing apparatus according to claim 1, further including circuit means for realizing said emphasis means and said deemphasis means in a circuit configuration common to said emphasis means and said deemphasis means.

4. A chrominance signal recording and reproducing apparatus for a video tape recorder including a signal extracting circuit for extracting separately a chrominance signal from a video signal containing a luminance signal and the chrominance signal, first conversion means for converting the chrominance signal extracted through said chrominance signal extracting means to a low-frequency band to obtain a low-frequency chrominance signal, recording/reproducing means for recording said low-frequency chrominance signal output of said first conversion means on a recording medium together with said luminance signal and reproducing said signals, and second conversion means for converting said low-frequency converted chrominance signal reproduced through said recording/reproducing means to the original chrominance signal; further comprising:
   an emphasis/deemphasis circuit for emphasizing side bands of said chrominance signal of small amplitude upon recording and deemphasizing said chrominance signal upon reproduction.

5. A chrominance signal recording and reproducing apparatus according to claim 4, wherein said emphasis/deemphasis circuit includes an emphasis circuitry for emphasizing the input chrominance signal upon recording, extracting circuitry for extracting the output signal of said emphasis circuitry as the chrominance signal to be recorded, an amplifier circuitry for amplifying the output signal of said emphasis circuitry and the input chrominance signal upon reproduction to thereby output a difference signal representative of difference between both said signals, a circuitry for feeding back the output signal of said amplifier circuitry to said emphasis circuitry to thereby deemphasize said input chrominance signal, and a circuitry for extracting the output signal of said amplifier circuitry as the chrominance signal to be reproduced.

6. A chrominance signal recording and reproducing apparatus according to claim 4, wherein said emphasis/deemphasis circuit includes a deemphasis circuitry for deemphasizing the input chrominance signal upon reproduction, extracting circuitry for extracting the output signal of said deemphasis circuitry as the chrominance signal to be reproduced, an amplifier circuitry for amplifying the output signal of said deemphasis circuitry and the input chrominance signal upon recording to thereby output a difference signal representative of difference between both said signals, a circuitry for feeding back the output signal of said amplifier circuitry to said deemphasis circuitry to thereby emphasize said input chrominance signal, and a circuitry for extracting the output signal of said amplifier circuitry as the chrominance signal to be recorded.

7. The chrominance signal recording and reproducing apparatus according to claim 4, wherein said emphasis/deemphasis circuit includes an emphasis circuitry for emphasizing the input chrominance signal upon recording, an adder circuitry for adding together the output signal of said emphasis circuitry and said input chrominance signal, an extracting circuitry for extracting the output signal of said adder circuitry as the chrominance signal to be recorded, a subtraction circuitry for subtracting the output signal of said emphasis circuitry and said input chrominance signal from each other upon reproduction, and a circuitry for feeding the output signal of said subtraction circuitry to said emphasis circuit and extracting said output signal as the chrominance signal for reproduction.

8. A chrominance signal recording and reproducing apparatus according to claim 4, wherein said emphasis/deemphasis circuit includes an emphasis circuitry for emphasizing the input chrominance signal upon reproduction, a subtraction circuitry from subtracting the output signal of said emphasis circuitry and said input chrominance signal from each other and deemphasizing said chrominance signal, an extracting circuitry for extracting the output signal of said subtraction circuitry as the chrominance signal to be reproduced, an adder circuitry for adding together the output signal of said emphasis circuitry and said input chrominance signal upon recording, and a circuitry for feeding the output signal of said adder circuitry to said emphasis circuit and extracting said output signal as the chrominance signal for recording.

9. A chrominance signal recording and reproducing apparatus according to claim 7, wherein said first conversion means includes reference carrier generating means for producing at least a reference carrier synchronized with the chrominance subcarrier frequency, said chrominance signal to be recorded being used as the input signal to said reference carrier generating means.

10. A chrominance signal recording and reproducing apparatus according to claim 7, wherein said second conversion means includes reference carrier generating means for producing at least a reference carrier synchronized with the chrominance subcarrier frequency, said chrominance signal to be reproduced being used as the input signal to said reference carrier generating means.

11. A chrominance signal recording and reproducing apparatus according to claim 7, wherein said emphasis/deemphasis circuit includes a switch circuitry for changing over a first input signal and a second input signal, an emphasis circuitry for emphasizing the output signal of said switch circuitry, and an amplifier circuit for amplifying difference between a third input signal and the output signal of said emphasis circuitry, means for supplying the chrominance signal to be recorded as said first input signal to said switch circuitry and producing the output signal of said emphasis circuitry as the chrominance signal for recording, means for supplying the chrominance signal to be reproduced as said third signal to said switch circuitry and producing the output signal of said amplifier circuitry as the chrominance signal to be reproduced, and means for supplying said output signal of said amplifier circuitry as the second input signal to said switch circuit.

12. A chrominance signal recording and reproducing apparatus according to claim 7, wherein said emphasis/deemphasis circuit includes a switch circuitry for changing over a first input signal and a second input signal to each other, an emphasis circuitry for emphasizing the output signal of said switch circuit, the chrominance signal to be recorded being supplied as said first input signal, an adder circuitry for adding together said chrominance signal and the output signal of said emphasis circuitry, means for producing the output signal of said adder circuitry as the chrominance signal to be recorded, a subtraction circuitry for subtracting the chrominance signal for reproduction and the output signal of said emphasis circuitry from each other, means for producing the output signal of said subtraction circuit as the chrominance signal for reproduction, and means for supplying the second input signal to said switch circuit.

13. A chrominance signal recording and reproducing apparatus according to claim 9, wherein said emphasis circuit includes at least an amplifier circuitry, a limiter circuit composed of diodes connected in anti-parallel to serve as a load circuit for said amplifier circuitry, and a trap circuit connected in parallel with said limiter circuit and designed to resonate at the chrominance subcarrier frequency.

14. A chrominance signal recording and reproducing apparatus according to claim 9, wherein said emphasis circuit includes at least an amplifier operating as a current supply circuit for the load circuit, said load circuit connected to said current source including at least a first resistor, an anti-parallel connection of diodes and a trap circuitry designed to resonate at the chrominance subcarrier frequency connected in parallel across said first resistor, a voltage appearing across said first resistor and said second resistor being outputted as said chrominance signal to be recorded, and a subtraction circuitry for subtracting a voltage appearing across said first resistor and the chrominance signal for reproduction from each other.

15. A chrominance signal recording and reproducing apparatus according to claim 9, wherein the subtraction circuit for subtracting the chrominance signal for reproduction and the output signal of the emphasis circuit from each other includes at least an amplifier circuitry, further including means for shifting phase at the chrominance subcarrier frequency in said amplifier circuitry.

16. A chrominance signal recording and reproducing apparatus according to claim 9, wherein said switch circuit selects said first input signal in the recording operation, while selecting said second input signal in the reproducing operation.

17. A chrominance signal recording and reproducing apparatus according to claim 9, wherein said means for producing the chrominance signal to be recorded includes at least a gain control circuitry, a reference voltage generating circuitry and an amplitude detecting circuitry which uses said first signal as the input signal thereto.

18. A chrominance signal recording and reproducing apparatus according to claim 9, wherein said means for producing the chrominance signal for reproduction includes at least a gain control circuitry, a reference voltage generating circuitry, and an amplitude detecting circuitry, said second signal being used as the input signal to said amplitude detecting circuitry.

19. A chrominance signal recording and reproducing apparatus according to claim 10, wherein one of the amplifier circuitries operates equivalently as a current supply circuit for the load circuitry, the load circuitry connected to said current supply circuit including at least a resistor, whereby a voltage produced across said resistor is led out as the output signal.

* * * * *